US012539826B2

United States Patent
Ohara et al.

(10) Patent No.: US 12,539,826 B2
(45) Date of Patent: Feb. 3, 2026

(54) LOCK CONTROL DEVICE AND VEHICLE DIGITAL KEY SYSTEM

(71) Applicant: DENSO CORPORATION, Kariya (JP)

(72) Inventors: Katsuhiro Ohara, Kariya (JP); Kensho Taki, Kariya (JP); Kunihiko Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 246 days.

(21) Appl. No.: 18/353,132

(22) Filed: Jul. 17, 2023

(65) Prior Publication Data
US 2024/0025374 A1     Jan. 25, 2024

(30) Foreign Application Priority Data
Jul. 20, 2022    (JP) ................. 2022-115392

(51) Int. Cl.
    *B60R 25/40*        (2013.01)
    *B60R 25/24*        (2013.01)

(52) U.S. Cl.
    CPC .......... *B60R 25/403* (2013.01); *B60R 25/243* (2013.01)

(58) Field of Classification Search
    CPC ............................ B60R 25/403; B60R 25/243
    USPC ........................................................ 340/5.72
    See application file for complete search history.

(56) References Cited

U.S. PATENT DOCUMENTS

| | | | |
|---|---|---|---|
| 8,463,484 B2 * | 6/2013 | Bamba ................. | B63H 21/22 340/568.1 |
| 2014/0125453 A1 * | 5/2014 | McIntyre ........... | G07C 9/00309 340/5.7 |
| 2015/0360646 A1 * | 12/2015 | Pribisic ................ | G06F 3/0447 340/5.54 |
| 2016/0004254 A1 * | 1/2016 | Matsumoto ......... | B60W 50/045 701/23 |
| 2019/0092281 A1 | 3/2019 | Okada et al. | |
| 2019/0217816 A1 * | 7/2019 | Lee ......................... | H04W 4/40 |
| 2020/0346617 A1 | 11/2020 | Okada et al. | |
| 2021/0127260 A1 * | 4/2021 | Lee ....................... | H04W 12/06 |
| 2021/0319639 A1 * | 10/2021 | Ho .......................... | G06F 21/31 |
| 2022/0176910 A1 | 6/2022 | Okada et al. | |
| 2022/0198863 A1 * | 6/2022 | Ho .......................... | G07C 9/37 |
| 2024/0010165 A1 | 1/2024 | Shi | |

FOREIGN PATENT DOCUMENTS

| | | | |
|---|---|---|---|
| JP | 2004-339737 | A | 12/2004 |
| JP | 2006-151266 | A | 6/2006 |
| JP | 2012-043167 | A | 3/2012 |
| JP | 2020-066860 | A | 4/2020 |
| JP | 2021-179169 | A | 11/2021 |

* cited by examiner

*Primary Examiner* — Kam Wan Ma
(74) *Attorney, Agent, or Firm* — Harness, Dickey & Pierce, P.L.C.

(57) ABSTRACT

A lock control system or a vehicle digital key system including an in-vehicle device, a mobile device, and a server controls operations of a plurality of authentication sensors for authenticating a user of a vehicle by at least one of a plurality of authentication methods. Thereby, it is possible to reduce a power consumption during standby.

17 Claims, 10 Drawing Sheets

| ORDER | METHOD | AUTH CODE |
|---|---|---|
| 1 | BLE | A2D1··· |
| 2 | NFC | B24C··· |
| 3 | IMAGE | 2EAC··· |

B31

LOCK CONTROL DEVICE AND VEHICLE DIGITAL KEY SYSTEM

CROSS REFERENCE TO RELATED APPLICATION

The present application claims the benefit of priority from Japanese Patent Application No. 2022-115392 filed on Jul. 20, 2022. The entire disclosure of the above application is incorporated herein by reference.

TECHNICAL FIELD

The present disclosure relates to a technology for unlocking or locking on condition that a user is authenticated.

BACKGROUND

In comparative examples, an in-vehicle system unlocks a vehicle on a condition that a user has been authenticated, and includes multiple types of authentication devices.

SUMMARY

A lock control system or a vehicle digital key system including an in-vehicle device, a mobile device, and a server controls operations of a plurality of authentication sensors for authenticating a user of a vehicle by at least one of a plurality of authentication methods.

DETAILED DESCRIPTION

Figure 1:
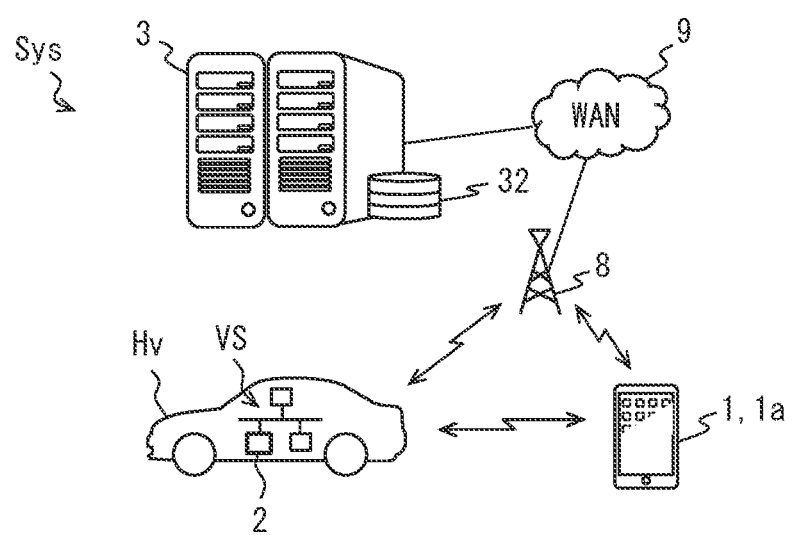
FIG. 1 is a diagram showing an overall configuration of a vehicle digital key system.

A vehicle includes various authentication sensors for authenticating a user is mounted. For example, the vehicle includes, as the authentication sensor, a communication device for receiving an authentication code transmitted from a mobile device of the user, a camera, a microphone, a fingerprint reader, a vein sensor, and the like. In the configuration in which the vehicle includes multiple authentication sensors, power consumption may increase when all of the multiple authentication sensors are driven during standby.

One example of the present disclosure provides a lock control device and a vehicle digital key system capable of reducing a power consumption during standby.

According to one example embodiment, a lock control device is connected to a first authentication sensor that acquires information for authenticating a user by a predetermined method and a second authentication sensor that acquires information for authenticating the user by a method different from the predetermined method of the first authentication sensor. The lock control device includes: an abnormality detection unit configured to detect an abnormality of the first authentication sensor; and a controller configured to control an operation of each of the first authentication sensor and the second authentication sensor. When the abnormality detection unit has not detected the abnormality of the first authentication sensor, the controller does not activate the second authentication sensor until an authentication process using at least the first authentication sensor is successful.

According to the above configuration, it is possible to reduce the power consumption since the frequency of activation of the second authentication sensor.

According to another example embodiment, a vehicle digital key system includes: an in-vehicle device configured to authenticate a person trying to access a vehicle using at least one of a plurality of authentication methods; a mobile device that is an information terminal carried by a user of the vehicle; and a server configured to communicate data with the mobile device and the in-vehicle device. The in-vehicle device includes a controller configured to control an operation of each of a plurality of authentication sensors corresponding to the plurality of authentication methods. The mobile device includes an operation response unit configured to transmit, to the server, an operation start signal that is a signal for starting authentication based on a user operation. The server includes: a status management unit configured to collect information related to the unusable method and usable method by communicating with the in-vehicle device or the mobile device; a selection unit configured to select an adapted method that is an authentication method actually used for an authentication process from the usable method in response to reception of the operation start signal from the mobile device; and a transmission processing unit configured to transmit, to the in-vehicle device, a command set including information related to at least one adopted method selected by the selection unit. The controller is configured to activate, among the plurality of authentication sensors, an authentication sensor corresponding to the adopted method indicated by the command set and is configured not to activate an authentication sensor corresponding to an unusable method different from the usable method. According to the above configuration, some of the plurality of authentication sensors of the vehicle are less likely to be activated. Therefore, it is possible to reduce the power consumption.

Hereinafter, a vehicle digital key system Sys of the present disclosure will be described with reference to the drawings. The vehicle digital key system Sys enables the user to access the vehicle Hv without having a dedicated key by distributing an authentication code, which is a code for using a vehicle Hv, to a mobile device 1.

The dedicated key of the present disclosure is a dedicated electronic key for operating the vehicle Hv. The dedicated key is provided to the owner together with the vehicle Hv as a proof of being the owner of the vehicle Hv or as a master key having an entity at the time of purchasing the vehicle Hv. The dedicated key can be understood as one of the accessories of the vehicle Hv. The dedicated key may be referred to as a vehicle portable device, a key fob, a key card, a card key, an access key, or the like.

The vehicle digital key system Sys includes the mobile device 1, an in-vehicle system 2, and a digital key server (DKS: Digital Key Server) 3, as shown in FIG. 1. The in-vehicle system 2 includes an authentication ECU 4. The ECU is an abbreviation for Electronic Control Unit.

The mobile device 1 is a general-purpose information processing terminal that can be possessed/carried by a user. The in-vehicle system 2 is installed in the vehicle Hv, and executes vehicle control according to a position of the user with respect to the vehicle Hv or a content of user operation on condition that the user has been authenticated. The vehicle control here includes locking or unlocking the door, turning on or off the power, starting an engine, or the like. The in-vehicle system 2 is called a smart entry system, a passive entry passive start (PEPS) system, or the like. The DKS 3 is a server placed outside the vehicle Hv.

The mobile device 1, the in-vehicle system 2, and the DKS 3 are able to communicate data with each other via a wireless base station 8 and a wide area communication network 9. The DKS 3 transmits an authentication code for using the vehicle Hv to the mobile device 1 based on a request from the mobile device 1. Further, the DKS 3 communicates with the in-vehicle system 2 to indirectly control an operation state of an authentication sensor 6x of the in-vehicle system 2. Data communication between devices can be performed by, for example, encrypted communication using TLS (Transport Layer Security).

The wireless base station 8 shown in FIG. 1 is, for example, a base station for cellular communication. The cellular communication refers to wireless communication that conforms to standards such as 4G and 5G. The wireless base station 8 may be an access point for Wi-Fi (registered trademark) or a roadside device. The wide area communication network 9 is, for example, the Internet.

Further, the in-vehicle system 2 and the mobile device 1 can perform short-range wireless communication. The short-range wireless communication here refers to communication conforming to a predetermined short-range wireless communication standard in which a practical communicable distance is, for example, 5 m to 30 m, and a maximum of about 100 m. Employed standards for the short-range wireless communication can include, for example, Bluetooth (registered trademark), Wi-Fi (registered trademark), Zig-Bee (registered trademark), UWB-IR (Ultra Wide Band-Impulse Radio), EnOcean (registered trademark), Wi-SUN (registered trademark) and the like. The Bluetooth standard includes BLE (Bluetooth Low Energy), Bluetooth Classic, and the like. As the Wi-Fi standard, various standards such as IEEE802.11n, IEEE802.11ac, and IEEE802.11ax (so-called Wi-Fi6) can be adopted. The IEEE (registered trademark) is an abbreviation for Institute of Electrical and Electronics Engineers, and refers to the American Institute of Electrical and Electronics Engineers.

Here, the operation of each part of the in-vehicle system 2 and the mobile device 1 will be described by taking as an example a case where the in-vehicle system 2 and the mobile device can perform the BLE communication, which is wireless communication conforming to the BLE standard. The description of BLE communication in the following can be performed in place of various short-range wireless communication methods.

In addition, the in-vehicle system 2 and the mobile device 1 can perform NFC communication, which is wireless communication according to the NFC (Near Field Communication) standard. The NFC communication here refers to communication in which a communicable distance is from several cm to several tens of centimeter (cm). The NFC communication can be called near field communication, contactless communication, or touch communication. The NFC communication corresponds to a communication method in which the communicable distance is sufficiently shorter (for example, one-tenth or less) than the BLE communication. As a specific communication standard for implementing the NFC communication, various standards such as ISO/IEC 14443 and ISO/IEC 18092 can be adopted. The near field communication may conform to a Type-F standard, or may conform to a Type-A or Type-B standard. The Type-F standard corresponds to so-called FeliCa (registered trademark).

The user of the present disclosure is a user of a service provided by the vehicle digital key system Sys. A person who has created an account for using the service provided by the vehicle digital key system Sys, in other words, the owner of the mobile device 1 on which the digital key application 104 described later is installed corresponds to the user. Naturally, there can be multiple vehicles and users managed by the DKS 3. Also, there may be multiple mobile devices 1. A user ID is set for each of multiple users. A device ID is set for each of the multiple mobile devices 1. The user ID is a management number for the DKS 3 to identify multiple users, and a different value is set for each user. A device ID is an identification number for identifying the mobile device 1.

Hereinafter, the description of the vehicle digital key system Sys is mainly focused on one vehicle Hv and one user. That is, the user hereinafter is any one person who has the right to use the vehicle Hv. The following description is applicable for each combination of vehicle and user.

<User Authentication Method>

The in-vehicle system 2 can authenticate a user by multiple types of methods. For example, the in-vehicle system 2 supports four types of authentication methods such as BLE authentication, NFC authentication, image authentication, and voice authentication. Since the mobile device 1 is associated with the user, authenticating the mobile device 1 corresponds to authenticating the user. That is, the user authentication can also be implemented by the authentication of the mobile device 1. The user authentication of the present disclosure can be appropriately read as device authentication.

The BLE authentication refers to a method in which the in-vehicle system 2 performs the BLE communication with the mobile device 1 to authenticate the user. For example, in processes of the BLE authentication, the mobile device 1 may transmit an authentication code to the in-vehicle system 2 via BLE communication, and the in-vehicle system 2 may verify the validity of a reception code. The reception code here refers to the authentication code received from the mobile device 1 in the in-vehicle system 2. The process of verifying the validity of the reception code includes determining whether a code decrypting the reception code using an encryption key for the mobile device 1 registered in the in-vehicle system 2 in advance matches a verification code held by the in-vehicle system 2.

The encryption key is a code for verifying the validity of a person trying to access the vehicle Hv, and is set to a different value for each mobile device 1. For example, the encryption key is an output value obtained by inputting, into a predetermined hash function, the user ID registered in the system by the user or the device ID of the mobile device 1. The encryption key is stored in each of the in-vehicle system 2 and the DKS 3. The verification code can be distributed from the DKS 3 to the in-vehicle system 2 for each authentication process. The verification code may be pre-registered in the in-vehicle system 2.

The NFC authentication refers to a method in which the in-vehicle system 2 performs the BLE communication with the mobile device 1 to authenticate the user. For example, in processes, the mobile device 1 may transmit an authentication code to the in-vehicle system 2 via the NFC communication, and the in-vehicle system 2 may verify the validity of the reception code. Image authentication can include a process in which the mobile device 1 displays an image showing an authentication code, and a process in which the in-vehicle system 2 reads the image with an in-vehicle camera and verifies the validity of the authentication code indicated by the read image. An image (hereinafter referred to as a code image) indicating the authentication code is, for example, a one-dimensional code such as a bar code or a two-dimensional code such as a QR code (registered trademark). The code image may be implemented as a multi-color code using two-dimensional array patterns with three or more colors. The code image may be a secure SQRC (registered trademark) that can be set to public or private for recorded information.

The voice authentication includes a process in which the mobile device 1 outputs a code tone from a speaker, and a process in which an in-vehicle system 2 collects a code tone with an in-vehicle microphone and verifies the validity of the authentication code indicated by the code tone pattern. The code tone is a continuous sound obtained by converting the authentication code by a predetermined method. The code tone corresponds to, for example, a synthesized signal tone obtained by converting each of multiple characters (numbers/characters/symbols) constituting the authentication code into different sounds for each character and connecting them. The code tone corresponds to, for example, a sound pattern converted from the authentication code using DTMF (Dual-Tone Multi-Frequency).

<Configuration and Function of Mobile Device>

Figure 2:
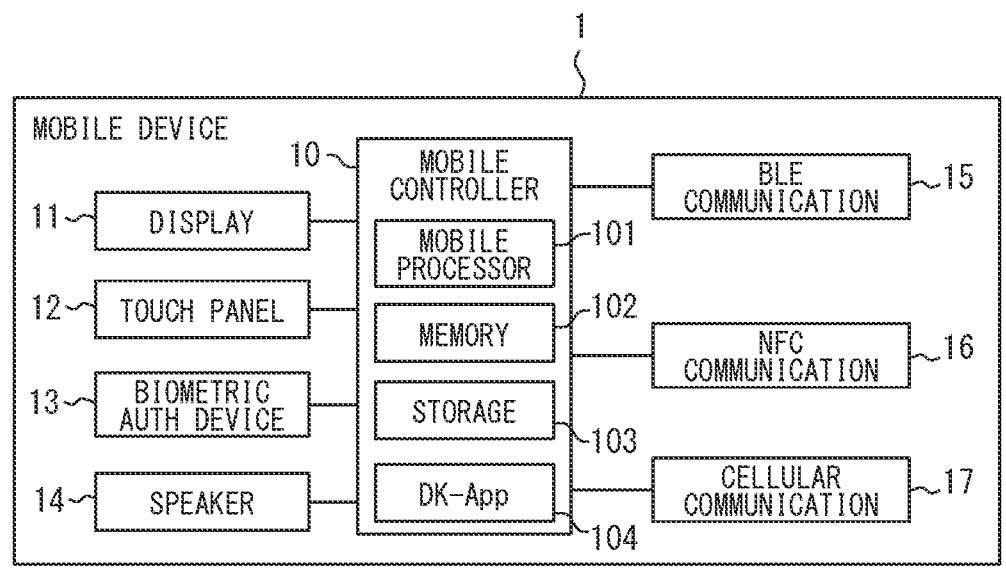
FIG. 2 is a block diagram showing a configuration of a mobile device.

Here, first, the configuration and function of the mobile device 1 will be described with reference to FIG. 2. As the mobile device 1, for example, a smartphone, a tablet terminal, a wearable device, or the like can be adopted. The wearable device is a device that is worn and used on the user's body, and can be of various shapes such as a wristband type, a wristwatch type, a ring type, a glasses type, and an earphone type. The wearable device may also include a hearable device.

The mobile device 1 includes a mobile controller 10, a display 11, a touch panel 12, a biometric authentication device 13, a speaker 14, an NFC communication unit 16, a BLE communication unit 15, and a cellular communication unit 17. In the drawings, the expression of "authentication" may be also referred to as "AUTH".

The mobile controller 10 is a module that controls the entire operation of the mobile device 1. The mobile controller 10 can mutually communicate with each of the display 11, the touch panel 12, the biometric authentication device 13, the NFC communication unit 16, the BLE communication unit 15, and the cellular communication unit 17. The mobile controller 10 is configured as a computer including, for example, a device processor 101, a memory 102, a storage 103, and the like. The device processor 101 is, for example, a CPU (Central Processing Unit). The memory 102 is a volatile storage medium such as RAM (Random Access Memory). The device processor 101 executes various processes for implementing a function of each of functional units described later by accessing the memory 102. The storage 103 includes a non-volatile storage medium such as a flash memory.

The mobile controller 10 also includes a digital key application 104 as application software (hereinafter referred to as application). The digital key application 104 is application software for securely performing user authentication, authentication code acquisition, storing, communication with the in-vehicle system 2, and the like. The digital key application 104 is installed in, for example, the storage 103. The description of the digital key application 104 hereinafter can be read as the mobile controller 10 or the device processor 101. Functions of the mobile controller 10 or the digital key application 104 will be described later.

The display 11 is, for example, a liquid crystal display or an organic EL display. The display 11 displays an image according to the input signal from the mobile controller 10. The touch panel 12 is a capacitance type touch panel, and is stacked on the display 11. The touch panel 12 and the display 11 correspond to interfaces for the user to input instructions to the digital key application 104 and for pairing the mobile device 1 and the in-vehicle system 2. The touch panel 12 is an input device. The signal output by the touch panel 12 corresponds to the user's operation on the mobile device 1. Hereinafter, the output signal of the touch panel 12 will also be referred to as an operation signal.

The biometric authentication device 13 is a device that authenticates a user by using, for example, a user fingerprint or a face image. The biometric authentication device 13 may be a device that authenticates a user by using a vein pattern of a hand or a finger or an iris pattern. The biometric authentication device 13 may be an ear acoustic authentication device that identifies (authenticates) the wearer using a sound reflection pattern determined by the shape of the ear hole. In addition, the biometric authentication device 13 may be a device that authenticates using the characteristics of the spoken voice such as a voiceprint. The user authentication result is provided to the mobile controller 10. The speaker 14 outputs sound based on the electrical signal input from the mobile controller 10. Sounds of the present disclosure may include sound effects, notification sounds, voices, melodies, music, and the like.

The NFC communication unit 16 is a communication module for implementing the NFC communication. The BLE communication unit 15 is a communication module for executing the BLE communication. The cellular communication unit 17 is a communication module for carrying out cellular communication. The cellular communication unit 17 is a communication module that is in charge of a data link layer and a physical layer in a wireless communication protocol such as LTE. The cellular communication unit 17 provides, to the mobile controller 10, data indicating a reception status of signals from the wireless base station 8, for example, whether the situation is out of the cellular service area. In the present disclosure, the situation out of the cellular service area refers to a situation outside the communication area of the wireless base station 8, in other words, a situation in which connection to the wide area communication network 9 is impossible. In the present disclosure, the area in which signals from the wireless base station 8 can be received is also described as an area within a cellular coverage area. The in-vehicle system 2 can be in an online state when the vehicle Hv is within the cellular service area, except when the cellular communication function is turned off for power saving or the like.

Various communication modules include an antenna capable of transmitting and receiving radio waves in a frequency band as a transmission and reception target, a communication microcomputer which is a microcomputer for controlling communication, a modulation-demodulation circuit, and the like. The mobile device 1 may include a Wi-Fi communication unit, which is a communication module for performing Wi-Fi communication, as means for communicating with the DKS 3.

When the mobile device 1 is connected to the wide area communication network 9 by cellular communication or Wi-Fi communication, that is, in a so-called online state, the mobile controller 10 performs various data communication with the DKS 3.

Figure 3:
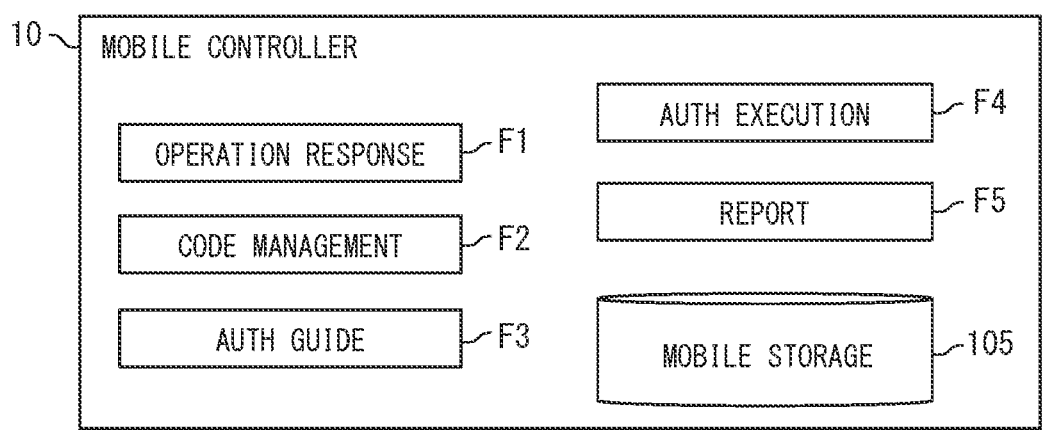
FIG. 3 is a functional block diagram of a mobile controller.

As shown in FIG. 3, the mobile controller 10 includes an operation response unit F1, a code management unit F2, an authentication guide unit F3, and an authentication execution unit F4, and a report unit F5 as functional units implemented when the device processor 101 executes the digital key application 104. The various functional units can be active in a state where the digital key application 104 authenticates the user (operator).

User authentication (i.e., login) by the digital key application 104 can be performed by inputting a predetermined user ID and a password to the digital key application 104. The user authentication by the digital key application 104 may be performed using the biometric authentication device 13. Since the digital key application 104 is a part of the vehicular digital key system Sys, the state in which the user is logged in to the digital key application 104 corresponds to the state in which the user is logged in to the vehicle digital key system Sys. The login state may be canceled when a predetermined expiration date has passed since the login, and the digital key application 104 may transition to a log-out (log-off) state that requires re-authentication of the user.

The mobile controller 10 also includes a mobile storage 105. The mobile storage 105 is a storage area in which various data used by the digital key application 104 are stored. The mobile storage 105 is implemented using a storage area provided in the memory 102 or the storage 103.

The operation response unit F1 executes processes according to the user operation on the mobile device 1. The operation response unit F1 acquires the contents of the user instruction based on user selection operation on the buttons displayed on the display 11 and voice input data. For example, the operation response unit F1 transmits a code issue request to the DKS 3 in response to pressing of an operation start button B11 illustrated in FIG. 4. The operation start button B11 is a button for starting an operation (such as unlocking) of the vehicle Hv. The code issue request is a wireless signal requesting transmission of the authentication code. The wireless signal here can be read as a message, frame, packet, or the like. The code issue request corresponds to an operation start signal.

Figure 4:
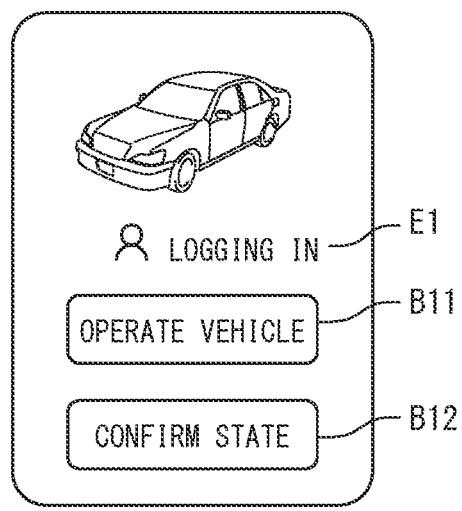
FIG. 4 is a block diagram showing one example of a display screen of the mobile device.

FIG. 4 is one example of a home screen of the digital key application 104. The home screen is a screen displayed after application activation or login, and can correspond to a standby screen for user operations. The home screen can include a login state notification image E1 indicating the login state, a state confirmation button B12 for displaying a screen indicating the current state of the vehicle Hv, and the like. Further, the operation response unit F1 can display an operation screen illustrated in FIG. 5 in response to pressing of the operation start button B11. The operation screen can include an unlock button B21, a lock button B22, a start button B23, and the like. The unlock button B21 is a button for instructing unlocking, and the lock button B22 is a button for instructing locking. The start button B23 is a button for switching on a traveling power source. The traveling power source is a power source for travel of the vehicle Hv, and refers to an ignition power source when the vehicle is a combustion engine vehicle. When the vehicle Hv is an electric vehicle or a hybrid vehicle, a system main relay corresponds to the traveling power source.

Figure 5:
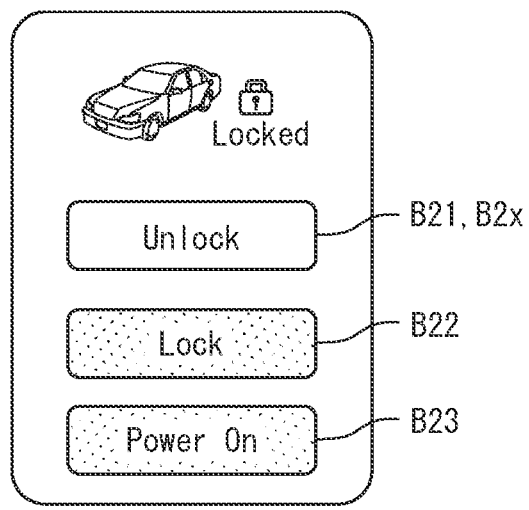
FIG. 5 is a block diagram showing one example of the display screen of the mobile device.

FIG. 5 illustrates a case where the vehicle Hv is currently locked and the lock button B22 and the start button B23 are displayed in a non-selectable mode. The non-selectable mode refers to, for example, a graying-out state or a tone-down state. Options that cannot be selected may be hidden. Control buttons B2$x$ such as the unlock button B21, the lock button B22, and the start button B23 may be provided on the home screen. The screen configuration can be changed as appropriate. The operation response unit F1 may transmit the code issue request based on pressing of the control button B2$x$ such as the unlock button B21. The control buttons B2$x$ may be arranged on the home screen. Further, the home screen may be provided with an authentication start button, which is a button for requesting the issuance of the authentication code. In that case, the operation response unit F1 may transmit the code issue request based on pressing of the authentication start button.

Figures 6, 7:
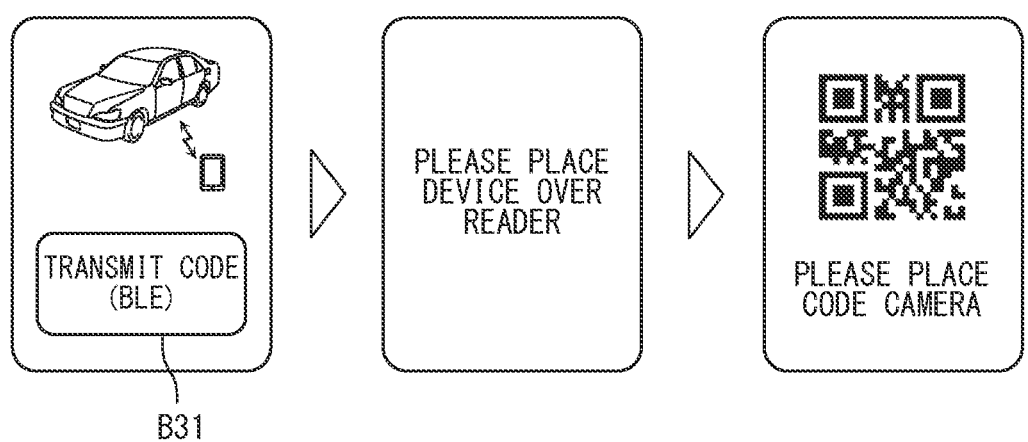
FIG. 6 is a diagram for illustrating contents of an authentication package.
FIG. 7 is one example of a guide image for each authentication process.

The code management unit F2 extracts (decompresses/decodes) the authentication package received from the DKS 3 and provides it to the authentication guide unit F3. The authentication package includes at least one authentication code and order designation data indicating an execution procedure of authentication processing. In one example of the present embodiment, the in-vehicle system 2 authenticates a user by so-called multi-step authentication including multiple processes (authentication process). For example, the in-vehicle system 2 implements three-step authentication, including three authentication processes. At least one of the authentication method or the authentication code differs for each authentication process. For example, as shown in FIG. 6, the authentication package is configured as a data set indicating an authentication method and an authentication code used in each authentication process. The authentication package can be understood in one aspect as a data set that instructs the mobile device 1 how to execute the authentication process. The authentication package may also be referred to as a command set for the mobile device.

The authentication guide unit F3 guides the operation for executing the authentication process according to the procedure specified in the authentication package. The implementation guide for the authentication process can be implemented using images or sounds. For example, when the execution order of authentication processes is set in the order of BLE authentication, NFC authentication, and image authentication, images shown in FIG. 7 are displayed in order.

The authentication execution unit F4 is a functional module that executes substantive processes related to transmission and reception of the authentication code to and from the in-vehicle system 2. For example, in a phase of performing the BLE authentication, the authentication execution unit F4 generates a transmission frame containing the authentication code and outputs it to the BLE communication unit 15. The authentication code transmitted to the in-vehicle system 2 through the BLE communication is basically the authentication code received from the DKS 3 as a code for the BLE authentication.

In the phase of performing the NFC authentication, the authentication execution unit F4 generates a transmission frame containing the authentication code received from the DKS 3 for the NFC authentication, and sends it to the NFC communication unit 16. In the phase of performing the image authentication, the authentication execution unit F4 generates a code image based on the authentication code received from the DKS 3 for the image authentication, and causes the display 11 to display the code image. In the phase of performing the voice authentication, the authentication execution unit F4 generates an electrical code tone signal based on the authentication code received from the DKS 3 for the voice authentication, and sends it to the speaker 14.

The report unit F5 reports to the DKS 3 the result of verification for each process in the series of authentication processes. Also, when code collation in a certain authentication method fails, a message is sent to the DKS 3, and the message indicates that the corresponding in-vehicle equipment (authentication sensor) is malfunctioning.

<Configuration and Function of In-Vehicle System>

Figure 8:
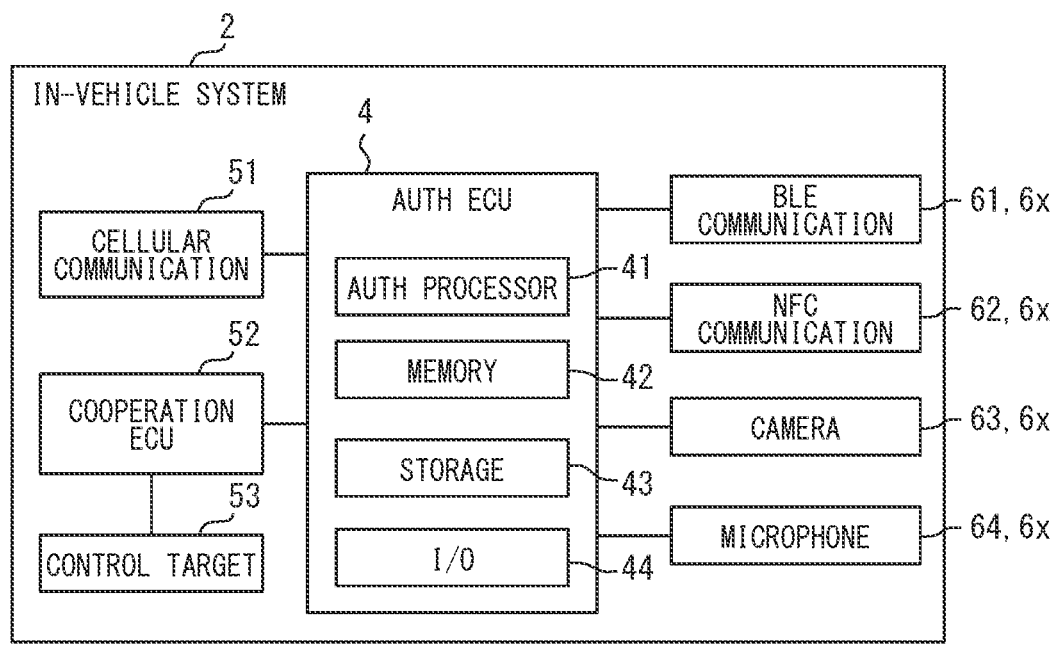
FIG. 8 is a block diagram showing the configuration of an in-vehicle system.

Here, the configuration and functions of the in-vehicle system 2 will be described. As shown in FIG. 8, the in-vehicle system 2 includes the authentication ECU 4, a cellular communication unit 51, a cooperation ECU 52, a control target 53, a BLE communication unit 61, an NFC communication unit 62, a camera 63 and a microphone 64.

The authentication ECU 4 is connected to each of the cellular communication unit 51, the cooperation ECU 52, the BLE communication unit 61, the NFC communication unit 62, the camera 63, and the microphone 64 via the in-vehicle network so as to be able to communicate with each other. The cooperation ECU 52 is communicably connected to the control target 53. The in-vehicle network is a communication network constructed in the vehicle Hv. As the standard of the in-vehicle network, various standards such as Controller Area Network (CAN: registered trademark), Ethernet (registered trademark), FlexRay (registered trademark), and the like can be adopted. Some devices such as the cellular communication unit 51 may be connected to the authentication ECU 4 by a dedicated line without passing through the in-vehicle network. The connection form between the devices can be changed as appropriate.

The authentication ECU 4 is an ECU that authenticates the user in cooperation with the BLE communication unit 61 and the like. Further, the authentication ECU 4 performs predetermined vehicle control, in cooperation with the cooperation ECU 52, such as unlocking the door and turning on the power for traveling on the condition that the authentication of the user is successful. The authentication ECU 4 maintains the function of authenticating the user by power supplied from an in-vehicle battery even while the traveling power source is off.

The authentication ECU 4 is implemented by a computer. That is, the authentication ECU 4 includes an authentication processor 41, a memory 42, a storage 43, an I/O 44, a bus line connecting these configurations, and the like. The authentication processor 41 is, for example, a CPU. The authentication processor 41 executes various processes for realizing a function of each of functional units described later by accessing the memory 42. The storage 43 stores a vehicle authentication program, which is a program for authenticating a user who accesses the vehicle Hv. The I/O 44 is a circuit module for communicating with another device. Details of the function of the authentication ECU 4 will be described later. The authentication ECU 4 corresponds to a lock control device and an in-vehicle device.

The cellular communication unit 51 is a communication module for performing cellular communication. The cellular communication unit 51 transmits data input from the authentication ECU 4 to the DKS 3 and outputs data received from the DKS 3 to the authentication ECU 4. The cellular communication unit 51 outputs to the authentication ECU 4 a connection status signal indicating whether the signal from the wireless base station 8 has been received, that is, whether the position is within the cellular service area. The cellular communication unit 51 may maintain a so-called standby state in which the signal from the wireless base station 8 can be received by power supplied from the in-vehicle battery even while the traveling power supply is off. The standby state corresponds to a state in which IP-PUSH notification from the DKS 3 can be received. The operation state of the cellular communication unit 51 may be controlled by the authentication ECU 4. The in-vehicle system 2 may include a module for Wi-Fi communication instead of the cellular communication unit 51 or in combination with the cellular communication unit 51.

The cooperation ECU 52 is arbitrary ECU connected to the authentication ECU 4. Multiple cooperation ECUs 52 may exist. The cooperation ECU 52 is, for example, a body ECU, a power supply ECU, and a display ECU. The body ECU is an ECU that controls body system actuators such as a door lock motor. The power supply ECU is an ECU that controls the on-off state of the traveling power supply mounted on the vehicle Hv. The display ECU is an ECU that controls the display of an in-vehicle display.

The cooperation ECU 52 controls the control target 53 based on the request from the authentication ECU 4. The control target 53 is an actuator or an electrical equipment that can be controlled by the cooperation ECU 52. The control target 53 may be, for example, a door lock motor, an in-vehicle display, a speaker, an in-vehicle lighting device, an air conditioner, or the like. The door lock motor is a motor for switching the state (locked, unlocked) of the lock mechanism of each door. The in-vehicle lighting device may be a headlight, a vehicle interior light, a welcome lamp, or the like. The in-vehicle display may be a liquid crystal display or an organic EL display installed in the vehicle, a projector that projects an image on a side window of the vehicle or on a road surface, or the like. The authentication ECU 4 may be configured so that direct control is possible for some control target 53 without the cooperation ECU 52.

The BLE communication unit 61 is a communication module for executing the BLE communication. The BLE communication unit 61 is arranged, for example, on the center console, the ceiling portion in the vehicle, the upper end portion of the front/rear glass, the C pillar, and the like. The operating state of the BLE communication unit 61 is controlled by the authentication ECU 4. The BLE communication unit 61 has a function as a reader for acquiring (receiving) the authentication code from the mobile device 1 through the BLE communication.

The NFC communication unit 62 is a communication module for implementing NFC communication. The NFC communication unit 62 has a function as a reader for acquiring (receiving) the authentication code from the mobile device 1. As the NFC communication unit 62, for example, a communication module for the outside of the vehicle and a module for the inside of the vehicle may be provided. The NFC communication unit 62 for the vehicle exterior corresponds to a configuration for performing authentication for locking-unlocking control. The in-vehicle NFC communication unit 62 corresponds to a configuration for performing authentication for on-off control of a traveling power supply. The NFC communication unit 62 for the vehicle exterior may be provided on an outside door handle, the side mirror, or the A, B, or C pillar close to a driver seat. The in-vehicle NFC communication unit 62 may be provided on an instrument panel, a center console, or the like. The operating state of each NFC communication unit 62 is controlled by the authentication ECU 4.

The camera 63 is an optical camera. The camera 63 corresponds to a device for reading a code image displayed on the mobile device 1. For example, the in-vehicle system 2 may include an exterior camera 63 and an interior camera 63. The operation of each camera 63 is driven based on a signal from the authentication ECU 4. The camera 63 for the vehicle exterior is arranged, for example, on the B pillar close to the driver seat side, on the edge of the roof, on the side mirror, and the like. The camera 63 for the vehicle interior is placed, for example, on a steering column cover, an upper end of a front window, or the like, with the optical axis towards a headrest of the driver seat. The image data acquired by the camera 63 is provided to the authentication ECU 4.

The microphone 64 is a device that converts sound into an electric signal and provides the authentication ECU 4 with the electric signal. The microphone 64 plays a role of collecting the code tone output by the mobile device 1, converting it into an electric signal (digital data), and outputting it to the authentication ECU 4. The in-vehicle system 2 may include a microphone 64 for outside the vehicle and a microphone 64 for the vehicle interior. The microphone 64 for the vehicle exterior can be placed on the B pillar close to the driver seat, side mirror, or the like. The microphone 64 for the vehicle interior may be placed around the driver seat, such as on the instrument panel or steering wheel.

The BLE communication unit 61, the NFC communication unit 62, the camera 63, and the microphone 64 can function as devices for acquiring information (here, the authentication code) for authenticating the user. Therefore, in the present disclosure, the BLE communication unit 61, the NFC communication unit 62, the camera 63, and the microphone 64 are also collectively referred to as the authentication sensor 6x.

In addition to the sensors, switches, and ECUs described above, various devices are directly or indirectly connected to the authentication ECU 4. For example, the authentication ECU 4 can receive an output signal from a courtesy switch, a shift position sensor, or the like. The courtesy switch is a switch that outputs a signal indicating whether the door is open or closed. The shift position sensor is a sensor that outputs a signal indicating a current shift position.

Figure 9:
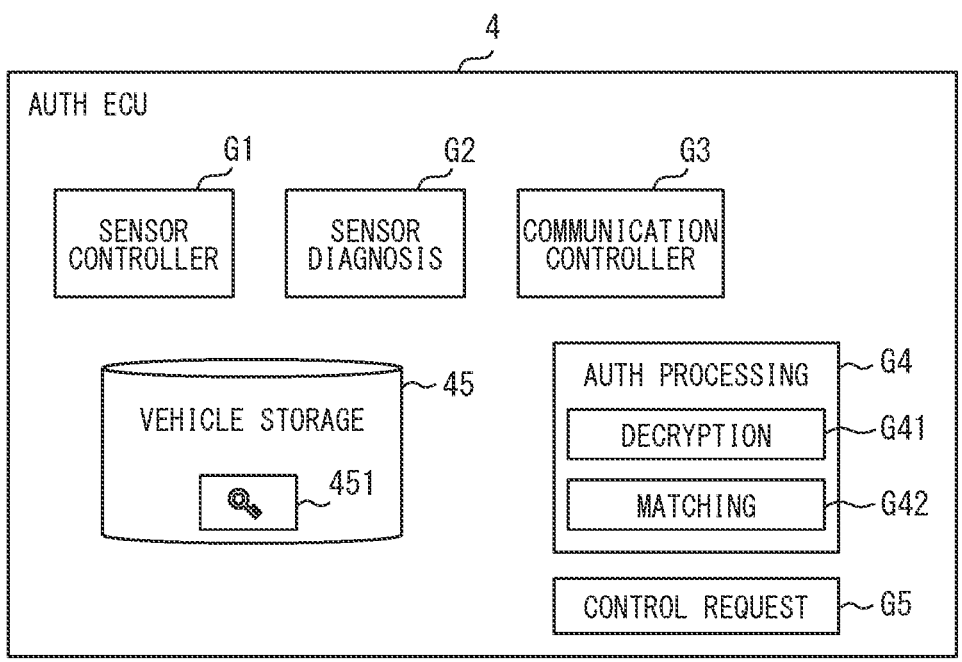
FIG. 9 is a functional block diagram of an authentication ECU.

The authentication ECU 4 includes, as functional units, a sensor controller G1, a sensor diagnosis unit G2, a communication controller G3, an authentication processing unit G4, and a control request unit G5, as shown in FIG. 9. These functional units are implemented, for example, by an authentication processor 41 executing a vehicle authentication program.

Further, the authentication ECU 4 also includes a vehicle storage 45 for storing data related to the user authentication. The vehicle storage 45 is implemented using a storage area provided in the storage 43 or the memory 42. The vehicle storage includes an encryption key storage 451. The encryption key storage 451 is a storage area in which encryption keys are stored. The encryption key described in the present disclosure is a code for authenticating the user by the in-vehicle system 2, and can be called an authentication encryption key.

The sensor controller G1 is a software module that controls the operation (active and sleep) of various authentication sensors 6x. A state in which the authentication sensor 6x is active corresponds to a state in which a wireless signal, image, or sound indicating the authentication code can be acquired. The active state can also be called a normal state. The sleep state refers to a state in which functions are more limited as compared to the active state, for example, a state in which signal transmission or reception is disabled. The sleep state may be a state in which the power is turned off. The sleep state may be a state in which power consumption can be reduced more than in the active state. The sleep state can also be called an off-state or an inactive state. The sleep state corresponds to a power saving state. Activating the authentication sensor 6x corresponds to transitioning from the sleep state to the active state.

While the vehicle Hv is parked, the sensor controller G1 sets each authentication sensor 6x to the sleep state when activation conditions described below are not satisfied (that is, basically). The authentication ECU 4 basically keeps the sleep state of even the highest priority sensor during parking. The sensor controller G1 activates the authentication sensors 6x in order, for example, according to the procedure specified in the verification package distributed from the DKS 3. The sensor controller G1 activates the authentication sensor 6x corresponding to the next process each time the previous process among multiple authentication processes is completed. The authentication sensor 6x to be activated is selected by the authentication processing unit G4. The sensor controller G1 activates the authentication sensor 6x in the sleep state or causes the active authentication sensor 6x to sleep based on the instruction from the authentication processing unit G4.

The sensor diagnosis unit G2 determines whether each authentication sensor 6x functions normally by communicating with each authentication sensor 6x. Whether the authentication sensor normally functions is determined by various methods such as a watchdog timer method and a homework answer method. The sensor diagnosis unit G2 may determine that the authentication sensor 6x is malfunctioning when communication with the authentication sensor 6x is not possible due to cable disconnection, connector disconnection, or the like.

Further, the sensor diagnosis unit G2 may diagnose the authentication sensor 6x by a method according to the type of the authentication sensor 6x. For example, the sensor diagnosis unit G2 may detect an abnormality in the camera 63 based on a fact that some pixels of the image provided from the camera 63 always have a constant value. Further, based on a fact that a noise level input from the microphone 64 is equal to or higher than a predetermined value, the periphery may be regarded as a noisy environment, and it may be determined that authentication using the microphone 64 does not function temporary and normally. The case where the sensor does not function normally or the case where the malfunction is occurring can include a case where the authentication process is likely to fail due to the noise even when the sensor normally operates.

The diagnosis result of the sensor diagnosis unit G2 is stored in the memory 42 and transmitted to the DKS 3 by the communication controller G3, for example. The sensor diagnosis unit G2 may diagnose the authentication sensor 6x periodically or upon detection of a specific event. The specific event can be a timing at which the traveling power supply is switched from on to off or from off to on. The sensor diagnosis unit G2 corresponds to an abnormality detection unit. The mobile device 1 and the DKS 3 may have a function as an abnormality detection unit.

The communication controller G3 controls the operation (active or inactive) of the cellular communication unit 51. A state in which the cellular communication unit 51 is active corresponds to a state in which a function for communicating with the wireless base station 8 is in operation, such as a standby state, for example. A state in which the cellular communication unit 51 is inactive is a state in which a signal from the wireless base station 8 cannot be received, and corresponds to a state in which the reception function is turned off. The state in which the cellular communication unit 51 is inactive may be a state in which the cellular communication unit 51 is powered off. Based on the connection status signal input from the cellular communication unit 51, the communication controller G3 may change a control strategy for the operation of the cellular communication unit 51 during parking.

For example, when the vehicle is parked outside the cellular service area, the communication controller G3 may turn off the power of the cellular communication unit 51 thereafter. Whether the parking position is outside the cellular service area can be identified based on the connection status signal that was last input at the time when the traveling power source was switched from the on-state to the off-state. The off-state of the traveling power source corresponds to the state in which the vehicle is parked.

On the other hand, when the parking position is within the cellular service area, the communication controller G3 keeps the cellular communication unit 51 operating in the standby state even during parking. In another aspect, the communication controller G3 may operate the cellular communication unit 51 in a low power consumption mode when the position where the vehicle is parked is within the cellular service area. The low power consumption mode is a mode that performs intermittently (temporarily) activation and connection to the wireless base station 8.

By intermittently activating the cellular communication unit 51, it becomes possible to receive a verification package from the DKS 3 even while the vehicle is parked. Returning the cellular communication unit 51 to the active state corresponds to inquiring of the DKS 3 whether there is data (message) for the vehicle Hv.

A return interval, which is the interval at which the cellular communication unit 51 returns to the active state in the low power consumption mode, can be set to 1 second, 3 seconds, 10 seconds, or the like. The return interval may be changed according to an elapsed parking time, which is the elapsed time from when the traveling power source is set from the on-state to the off-state. The communication controller G3 may lengthen the return interval as the elapsed parking time increases. For example, the communication controller G3 sets the return interval to 1 second, 2 seconds, or 3 seconds when the parking elapsed time is less than a predetermined value (30 minutes). On the other hand, when the elapsed parking time is equal to or longer than a predetermined value, the communication controller G3 may set the return interval to 5 seconds, 10 seconds, 15 seconds, or the like.

Further, the communication controller G3 may change the return interval according to a battery voltage. Since a value of the battery voltage decreases as the elapsed parking time increases, the battery voltage value can be used as an indicator of the elapsed parking time. For example, the communication controller G3 sets the return interval to 1 second, 2 seconds, or 3 seconds when the battery voltage is equal to or higher than a predetermined value (12.0 V). On the other hand, when the battery voltage is less than the predetermined value, the communication controller G3 may set the return interval to 5 seconds, 10 seconds, 15 seconds, or the like.

The communication controller G3 cooperates with the cellular communication unit 51 to perform processing related to data communication with the DKS 3. The communication controller G3 may transmit a sensor status report, which is a communication packet indicating, for example, whether each authentication sensor 6x is operating normally or has a malfunction, to the DKS 3. Further, the communication controller G3 may transmit an authentication result report, which is a communication packet indicating the result of the authentication process, to the DKS 3. Further, when the traveling power source is turned on or off, the communication controller G3 may transmit a signal indicating the state to the DKS 3. In addition, the communication controller G3 may cooperate with the cellular communication unit 51 to transmit a current position, a room temperature, a battery remaining amount/gasoline remaining amount, or the like to the DKS 3. The communication controller G3 can transmit data indicating the current status (so-called current situation) of the vehicle Hv to the DKS 3.

Further, the communication controller G3 receives the verification package from the DKS 3 and transmits it to the authentication processing unit G4. The verification package includes order designation data indicating the execution procedure of the authentication processes, and authentication codes used in each authentication process or verification codes based on the authentication codes. The communication controller G3 also receives the encryption key from the DKS 3 and stores it in the encryption key storage 451.

The authentication processing unit G4 performs multi-step authentication according to the procedure specified by the verification package. The authentication processing unit G4 includes a decryption unit G41 and a matching unit G42 as sub-function units. The decryption unit G41 decrypts the reception code, which is the authentication code acquired via the authentication sensor 6x, using the encryption key stored in the encryption key storage 451. The matching unit G42 compares the decrypted reception code obtained by decrypting the reception code by the decryption unit G41 with the verification code obtained from the DKS 3. Hereinafter, the decrypted reception code is also referred to as the reception code. When the reception code and the verification code do not match, the authentication processing unit G4 determines that the authentication has failed. A comparison (code matching) between the reception code and the verification code is performed at each authentication process. The authentication processing unit G4 determines that the user authentication is successful based on the successful code collation in all processes. Details of the operation of the authentication processing unit G4 will be described later.

The control request unit G5 cooperates with the cooperation ECU 52 to perform vehicle control according to the user operation based on the success of the user authentication. For example, when a signal indicating that the unlocking button B21 has been pressed by the user is received by the cellular communication or the BLE communication, a body ECU as the cooperation ECU 52 is requested to unlock the door. The body ECU controls a door lock motor based on the request from the authentication ECU 4 to switch the door to the unlocked state. Similarly, other vehicle controls such as locking, on-off switching of the traveling power source, and activation of an air conditioning function can be performed by the control requesting unit G5 in cooperation with the cooperation ECU 52. In another embodiment, the authentication ECU 4 itself may directly control the control target 53 so that the control according to the user operation can be performed.

<Configuration and Function of DKS>

Figure 10:
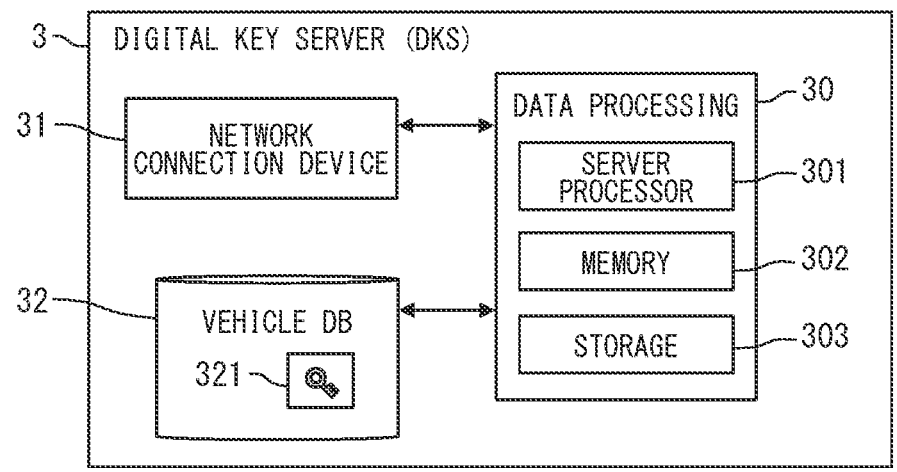
FIG. 10 is a block diagram showing a configuration of DKS.

Here, the configuration and the function of the DKS 3 will be described. The DKS 3 includes a data processing unit 30, a network connection device 31, and a vehicle DB 32, as shown in FIG. 10. The DB is an abbreviation for database.

The data processing unit 30 executes various processes based on signals or data input from the network connection device 31. The data processing unit 30 is connected to each of the network connection device 31 and the vehicle DB 32 so as to be able to communicate with each other. The data processing unit 30 is configured by using a server processor 301, a memory 302, and a storage 303. The server processor 301 is an arithmetic core that executes various arithmetic processes, and is implemented by using, for example, a CPU or a GPU. The storage 303 stores a vehicle management program. By executing the vehicle management program by the server processor 301, various functional units, which will be described later, are implemented. Execution of the vehicle management program by the server processor 301 corresponds to execution of a vehicle management method, which is a method corresponding to the program.

The network connection device 31 is a communication module for connecting to the wide area communication network 9. The network connection device 31 is capable of intercommunication with communication equipment constituting the wide area communication network 9 using, for example, an optical fiber. As a result, the DKS 3 can perform data communication with the mobile device 1 when the mobile device 1 is online. Similarly, when the in-vehicle system 2 is online, the DKS 3 also performs data communication with the in-vehicle system 2.

The vehicle DB 32 is a database in which information about the vehicle managed by the vehicle digital key system Sys is registered, and information about the in-vehicle system 2 is stored. The information about the in-vehicle system 2 includes, for example, a vehicle ID of the vehicle Hv, on-board sensor data, status data, user data, encryption keys, and the like.

The vehicle ID is a unique identification number assigned to each vehicle Hv. The on-board sensor data is data indicating a combination of the authentication sensors 6x provided in the vehicle Hv, in other words, a combination of authentication methods that can be performed by the in-vehicle system 2 or the authentication ECU 4. The in-vehicle system 2 is a system centering on the authentication ECU 4. The in-vehicle system 2 in the following description can be appropriately read as the authentication ECU 4.

The status data includes information regarding whether the vehicle Hv is within the cellular service area. Further, the status data includes sensor state information indicating the state of the authentication sensor 6x provided in the vehicle Hv, that is, whether it functions normally. The status data includes availability information for each authentication method that can be performed by the in-vehicle system 2. The availability information of the authentication method can be used as data indicating whether the in-vehicle system 2 can actually use (perform) the authentication method, and can be updated in conjunction with the sensor state information.

In addition, the status data may include the elapsed parking time, the remaining time until the in-vehicle system 2 becomes online next time, the current position, the room temperature, the battery level, the gasoline level, and the like. The values of various items configuring the status data can be updated at any time through communication with the authentication ECU 4 or the mobile device 1, as described below. Further, the vehicle DB 32 can also store information such as update dates and times of various information.

The user data is information about the user of the vehicle Hv, and includes, for example, user ID, password, telephone number as contact information, e-mail address, device ID, and the like. The user ID and the password are a data set for authenticating the user. The user ID and the password are registered by the user, for example, when the account is created.

The encryption key is generated, for example, when an account is created, and stored in an encryption key storage 321. The encryption key storage 321 is an area in which the encryption key is stored in the vehicle DB 32. Also, the DKS 3 distributes the generated encryption key to the in-vehicle system 2 through cellular communication. As a result, the same encryption key corresponding to one user or one mobile device 1 is stored in each of the DKS 3 and the authentication ECU 4. The method for sending the encryption key from the DKS 3 to the authentication ECU 4 is not limited to the cellular communication. The DKS 3 may distribute the encryption key to the authentication ECU 4 via the mobile device 1. Registration of the encryption key in the authentication ECU 4 may be performed using a dedicated registration tool that is handled at a dealer shop or the like.

The vehicle DB 32 is implemented using the rewritable non-volatile storage medium. Further, the vehicle DB 32 is configured so that the server processor 301 can write, read, and delete data. The vehicle DB 32 may be provided by another server that is physically independent of the DKS 3. Further, the DKS 3 may be implemented by being divided into multiple servers. The division of roles or function arrangement for each server can be changed as appropriate.

Figure 11:
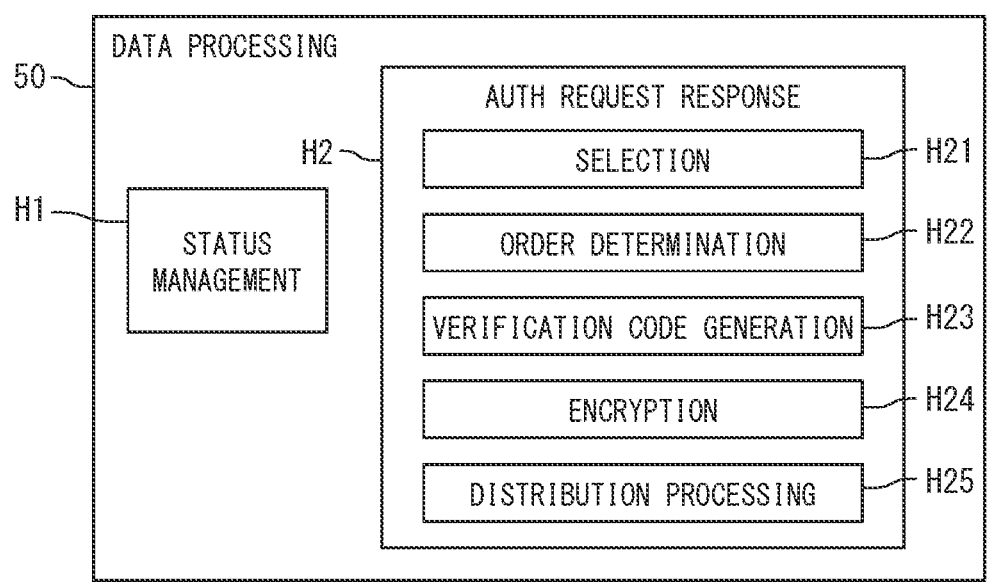
FIG. 11 is a functional block diagram of a data processor.

As shown in FIG. 11, the data processing unit 30 includes a status management unit H1 and an authentication request response unit H2 as functional units.

The status management unit H1 updates the status data of the in-vehicle system 2 by communicating with the in-vehicle system 2. For example, the status management unit H1 updates data indicating the state (on or off) of the traveling power source based on a report from the in-vehicle system 2. Further, the status management unit H1 updates the sensor status information indicating the status (normal or abnormal) of each authentication sensor 6x based on the report from the in-vehicle system 2. For example, when the in-vehicle system 2 reports a malfunction of the camera 63, the authentication method using the camera 63 is set to be unavailable. When the status management unit H1 receives from the in-vehicle system 2 a report that the authentication sensor 6x, which has received the report of the malfunction, functions normally, the status management unit H1 sets the authentication method using the authentication sensor 6x to be available again. In this manner, the status management unit H1 manages the available authentication method and the unavailable authentication method among the authentication methods that can be performed by the in-vehicle system 2 according to the state of the authentication sensor 6x provided in the in-vehicle system 2. An authentication method whose availability information is set to be available corresponds to a usable method, and an authentication method whose availability information is set to be unavailable corresponds to an unusable method.

Also, the status management unit H1 determines whether the vehicle Hv exists within the cellular service area, and stores the result in the vehicle DB 32. For example, the DKS 3 periodically confirms communication with the in-vehicle system 2. A communication confirmation interval can be set to 10 seconds, 30 seconds, 1 minute, or the like. The status management unit H1 determines that the in-vehicle system 2 is located outside the cellular service area when the communication with the in-vehicle system 2 is disabled for a certain period of time (for example, 90 seconds). The status management unit H1 may grasp whether the mobile device 1 exists within the cellular service area by a similar method.

The authentication request response unit H2 is a functional block that generates an authentication package and a verification package based on the reception of the code issue request from the mobile device 1, and executes processing for transmitting them to each device. The authentication request response unit H2 includes, as sub-functional blocks, a selection unit H21, an order determination unit H22, a verification code generation unit H23, an encryption unit H24, and a distribution processing unit H25. The selection unit H21 selects an authentication method to be used for the actual authentication process from available authentication methods.

As described above, in one example, the in-vehicle system 2 authenticates a user by the three-step authentication. In this case, the selection unit H21 selects three adopted methods, which are authentication methods used for the three-step authentication, from available authentication methods based on the priority set in advance for each authentication method. The priority for each authentication method may be changeable by the user. In the present disclosure, the authentication sensor 6x with the highest priority is also referred to as the highest priority sensor. The highest priority sensor corresponds to a first authentication sensor. Also, the authentication sensor 6x with the second highest priority is also referred to as a sub-priority sensor. The sub-priority sensor corresponds to a second authentication sensor. Authentication methods other than the adopted method correspond to non-adopted methods. If the contents of the three-step authentication are the BLE authentication, the NFC authentication, and the image authentication, the voice authentication may be the non-adopted method.

When the number of available authentication methods is insufficient for, for example, is not same as the number of authentication processes, the selection unit H21 may select one authentication method multiple times. For example, when the available authentication methods are only the BLE authentication and the image authentication, either BLE authentication or image authentication may be selected twice.

The order determination unit H22 is a functional unit that determines the execution order of the authentication methods selected by the selection unit H21. The execution order may be determined according to the priority described above. The content of the multi-step authentication is determined by the cooperation of the selection unit H21 and the order determination unit H22. The order determination unit H22 may be integrated with the selection unit H21.

The verification code generation unit H23 issues a verification code used in each authentication process. That is, the verification code generation unit H23 generates a verification code for the first authentication process, a verification code for the second authentication process, and a verification code for the third authentication process. The verification code has a different value for each issue. The verification code can be, for example, an epoch second, a count value of the number of issuances, or a random number. Further, the verification code may be a value obtained by subtracting the number of issuances from a predetermined initial value. The verification code corresponds to a seed of the authentication code.

The encryption unit H24 encrypts the verification code generated by the verification code generation unit H23 with an encryption key. The verification code encrypted with the encryption key corresponds to the authentication code. The authentication code and the verification code correspond to so-called disposable key codes (one-time keys) that are discarded after being used once.

The distribution processing unit H25 generates an authentication package and a verification package based on the data determined or generated by the above sub-function units. Then, the authentication package is distributed to the mobile device 1, and the verification package is distributed to the in-vehicle system 2. The verification package corresponds to the command set, in particular, a vehicle command set. The distribution processing unit H25 corresponds to a transmission processing unit.

In addition, the data processing unit 30 can have a function of performing new user registration, deletion, and change of registered contents based on data input from the network connection device 31. The new user registration, and the deletion correspond to issuance and deletion of an account. User operations and instructions related to the new registration, the deletion, and the change of registered contents are acquired, for example, via the mobile device 1 and the network connection device 31.

<Operation of Each Device for Unlocking Vehicle>

Figure 12:
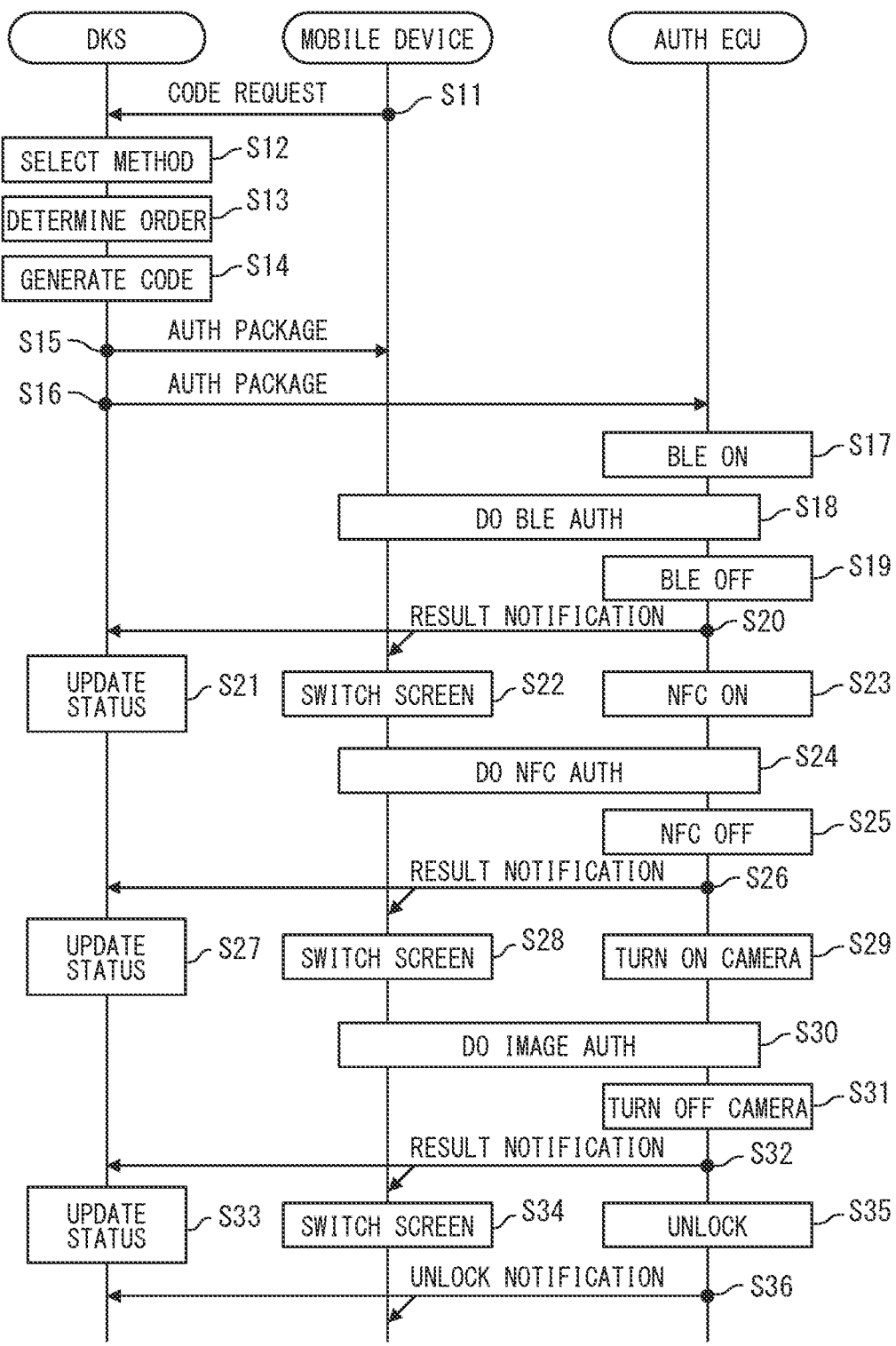
FIG. 12 is a sequence diagram for illustrating an interaction of the DKS, the mobile device and the authentication ECU for unlocking the vehicle.

Here, operations of the mobile device 1, the DKS 3, and the authentication ECU 4 in a case where the user unlocks the vehicle Hv using the digital key application 104 will be described with reference to FIG. 12. Descriptions of the mobile device 1 as the implementing entity of the following processes are appropriately read as the mobile controller 10, the digital key application 104, the operation response unit F1, the code management unit F2, the authentication guide unit F3, the authentication execution unit F4, and the report unit F5. Further, the descriptions of the DKS 3 can be read as the data processing unit 30, the authentication request response unit H2, the selection unit H21, the order determination unit H22, the verification code generation unit H23, the encryption unit H24, and the distribution processing unit H25. Furthermore, the descriptions of the authentication ECU 4 can be read as the authentication processor 41, the sensor controller G1, the sensor diagnosis unit G2, the communication controller G3, the authentication processing unit G4, and the control request unit G5.

A sequence for unlocking using the digital key application 104 is triggered by the user operation on the mobile device 1. When the user presses the operation start button B11 of the mobile device 1, the mobile device 1 transmits the code issue request to the DKS 3 (S11). The process S11 corresponds to a process in which the mobile device 1 transmits the code issue request to the DKS 3 based on the user operation.

Upon receiving the code issue request from the mobile device 1, the DKS 3 executes a sequence of generating the authentication package and the verification package. That is, selection of the authentication method (S12), determination of the order of execution (S13), and generation of the verification code for each authentication process (S14) are performed. The verification code for each authentication process generated in S14 is encrypted by the encryption unit H24 and becomes the authentication code.

A process in S15 is a process of transmitting a data set including the content of each authentication process determined in the above process and the authentication code to the mobile device 1 as the authentication package. The mobile device 1 starts authentication guidance in response to the reception the authentication package. For example, a guide screen corresponding to the first stage authentication method is displayed.

A process in S16 is a process of generating the verification package, which is a data set including the authentication method and verification code of each authentication process, and transmitting the verification package to the vehicle Hv. The in-vehicle system 2 operates the cellular communication unit 51 in a standby state even while the vehicle is parked, and maintains the online state. Therefore, the in-vehicle system 2 can receive the verification package from the DKS 3 even while the vehicle Hv is parked. As described above, the in-vehicle system 2 may be set to be online intermittently during standby. In that case, the in-vehicle system 2 can receive the verification package issued by the DKS 3 at the timing when the in-vehicle system 2 becomes online.

Upon receiving the verification package, the authentication ECU 4 starts a sequence of the authentication process (multi-step authentication) based on the data indicated in the package. Here, it is assumed that the authentication ECU 4 performs the BLE authentication, the NFC authentication, and the image authentication as the multi-step authentication process. However, the contents of the authentication process can be changed as appropriate according to the situation and settings. In the present disclosure, the n-th (n is a natural number) authentication process is also referred to as n-th authentication. For example, the first authentication refers to a first stage of the authentication process. Further, in the present disclosure, the authentication sensor 6x corresponding to the n-th authentication is also referred to as a n-th sensor. For example, a first sensor refers to the authentication sensor 6x corresponding to the first authentication. An authentication sensor 6x corresponding to a certain authentication method refers to a device for reception, reading, or listening of an authentication code transmitted, displayed, or output as audio, from the mobile device 1.

Figure 13:
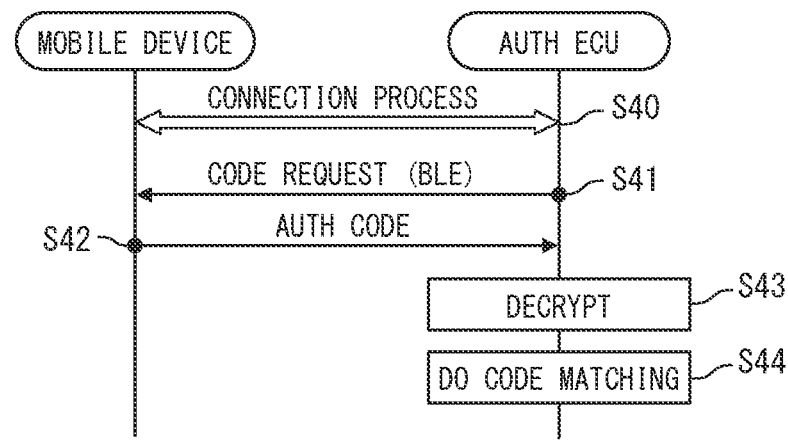
FIG. 13 is a diagram showing one example of a BLE authentication process.

When the BLE authentication is set as the first authentication, in response to the reception of the authentication package, the authentication ECU 4 causes the BLE communication unit 61 to transition to the active state (S17) and performs the BLE authentication (S18). The BLE authentication may include processes in S40 to S44, for example, as shown in FIG. 13. The process S40 is a process of establishing a BLE communication link with the mobile device 1. A detailed sequence for establishing the communication link may be implemented in compliance with the BLE standard.

The process in S41 is a process in which the authentication ECU 4 transmits a BLE signal to the mobile device 1 to request transmission of the authentication code. Upon receiving the code request from the authentication ECU 4, the mobile device 1 returns the authentication code for the BLE authentication received from the DKS 3 to the authentication ECU 4 (S42).

Upon receiving the authentication code from the mobile device 1, the authentication ECU 4 decrypts the code using the locally stored encryption key to generate the reception code (S43). Then, the verification unit G42 compares the reception code with the BLE authentication verification code received from the DKS 3 (S44). When the two codes match as a result of the code comparison (verification) process, the authentication processing unit G4 determines that the first authentication has succeeded. On the other hand, when the two do not match, the authentication processing unit G4 determines that the authentication has failed. The determination result is stored in the memory 42 or the like and referred in subsequent processes. In such a manner, the BLE authentication may include a code request process (S41), a code return process (S42) and a code verification process (S44). When the BLE authentication process is completed, the authentication ECU 4 shifts the BLE communication unit 61 to a sleep state (step S19).

A process in S20 is a process of notifying the DKS 3 and the mobile device 1 of the first authentication result. The notification to the mobile device 1 may be implemented via the cellular communication. Also, the mobile device 1 may acquire the result of the first authentication from the DKS 3. The DKS 3 may receive the result of the first authentication from mobile device 1.

The DKS 3 updates the date and time when it is confirmed that the authentication sensor 6x (here, the BLE communication unit 61) involved in the first authentication is operating normally in response to the notification from the authentication ECU 4 (S21). When the DKS 3 receives a notification indicating that the BLE authentication has failed, the DKS 3 determines that there is a possibility that a malfunction has occurred in the BLE communication unit 61, and sets the BLE authentication availability information to be unavailable for a predetermined period. The period during which the unavailable setting is maintained can be, for example, 5 minutes, 10 minutes, 30 minutes, or the like.

Further, the mobile device 1 controls the display screen upon receiving the notification from the authentication ECU 4 (S22). For example, when receiving a notification of successful authentication, the mobile device 1 displays a guide image for second authentication. Further, when the mobile device 1 receives a notification of authentication failure from the DKS 3 or the authentication ECU 4, the mobile device 1 displays an image indicating that the authentication has failed. When the authentication process fails, the mobile device 1 may notify the DKS 3 that there is a malfunction in the sensor (for example, BLE communication unit) used for the first authentication.

When the first authentication (BLE authentication) has failed, the authentication ECU 4 returns to the standby state after, for example, outputting a notification sound indicating that the authentication has failed from a speaker (not shown). The standby state is the state before receiving the verification package.

The authentication ECU 4 implements the sequence for the second authentication, when the first authentication (BLE authentication) succeeds. For example, when the NFC authentication is set as the second authentication, the authentication ECU 4 activates the NFC communication unit 62 (S23) and performs the NFC authentication (S24). The NFC authentication, like the BLE authentication, may also include the code request process, the code return process, and the code verification process. When the NFC authentication process is completed, the authentication ECU 4 shifts the NFC communication unit 62 to the sleep state (S25).

A process in S26 is a process of notifying the DKS 3 and the mobile device 1 of the second authentication (NFC authentication) result. The DKS 3 updates the date and time when it is confirmed that the authentication sensor 6x (here, the NFC communication unit 62) involved in the second authentication is operating normally in response to the notification from the authentication ECU 4 (S27). When the DKS 3 receives a notification indicating that the NFC authentication has failed, the DKS 3 determines that there is a possibility that a malfunction has occurred in the NFC communication unit 62, and sets the NFC authentication availability information to be unavailable for a predetermined period.

Further, the mobile device 1 controls the display screen upon receiving the notification indicating the second authentication result from the authentication ECU 4 (S28). For example, when receiving a notification of successful authentication, the mobile device 1 displays a guide image for third authentication. Further, when the mobile device 1 receives a notification of authentication failure, the mobile device 1 displays an image indicating that the authentication has failed. When the second authentication fails, the authentication ECU 4 returns to the standby state after outputting a notification sound indicating that the authentication has failed from the speaker, similarly to the case where the first authentication fails.

The authentication ECU 4 implements the sequence for the third authentication, when the second authentication succeeds. For example, when the image authentication is set as the third authentication, the authentication ECU 4 activates the camera 63 (S29) and performs the image authentication (S30). The image authentication includes a process of extracting a code image from a camera image, a process of obtaining an authentication code by analyzing the code image, and a process of comparing the reception code obtained by decrypting the authentication code with the verification code. When the code image cannot be read even after a predetermined time (for example, 30 seconds) has elapsed since the camera 63 was activated, the authentication ECU 4 may determine that the image authentication has failed. When the image authentication is completed, the authentication ECU 4 shifts the camera 63 to the sleep state (S31).

A process in S32 is a process of notifying the DKS 3 and the mobile device 1 of the third authentication (image authentication) result. The DKS 3 updates the date and time when it is confirmed that the authentication sensor 6x (camera 63) involved in the third authentication is operating normally in response to the notification from the authentication ECU 4 (S33). When the DKS 3 receives a notification indicating that the image authentication has failed, the DKS 3 determines that there is a possibility that a malfunction has occurred in the camera 63, and may set the image authentication availability information to be unavailable for a predetermined period.

Further, the mobile device 1 controls the display screen upon receiving the notification indicating the third authentication result from the authentication ECU 4 (S34). For example, when a notification of the third authentication success is received, an image indicating that multi-step authentication has succeeded may be displayed. Further, when the mobile device 1 receives a notification of authentication failure, the mobile device 1 displays an image indicating that the authentication has failed. When the third authentication fails, the authentication ECU 4 returns to the standby state after outputting a notification sound indicating that the authentication has failed from the speaker, similarly to the case where the first authentication fails.

The content of the first, second, or third authentication may be voice authentication. When the third authentication is set to the voice authentication, the authentication ECU 4 activates the microphone 64 based on the success of the second authentication, the voice authentication is performed, and the microphone 64 is turned off.

The authentication ECU 4 implements control (here unlocking) according to the user operation based on the success of all the authentication processes (S35). After the completion of unlocking, the authentication ECU 4 notifies the DKS 3 and the mobile device 1 that the designated control has been completed (S36). Based on the notification, the DKS 3 updates the status information of the vehicle Hv, and the mobile device 1 switches the display screen. For example, the display 11 displays an image indicating that the unlock has succeeded.

Further, the mobile device 1 may display an unlock completion button, which is a button for registering that the vehicle Hv has been unlocked, on the display 11 based on the notification from the authentication ECU 4 or the DKS 3. The user can press the unlock confirmation button when confirming that the vehicle Hv is actually unlocked. The mobile device 1 may transmit a confirmed signal to the DKS 3 based on pressing of the unlock confirmation button. The confirmed signal is a signal that notifies the DKS 3 that the user has confirmed that the vehicle Hv has been unlocked. The DKS 3 may confirm the registration that the vehicle Hv is in the unlocked state based on the reception of the confirmed signal.

<Supplement Regarding Authentication Failure>

The mobile device 1 may send a retry request based on a verification failure in some authentication process. The retry request corresponds to a code issue request including information indicating a failure method. The failure method is an authentication method corresponding to an authentication process in which an authentication error has occurred. The retry request corresponds to an error message.

Figure 14:
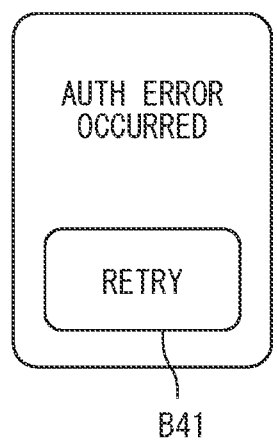
FIG. 14 is a diagram showing one example of the display screen of the mobile device when an authentication error occurs.

The mobile device 1 may automatically transmit a retry request based on the occurrence of an authentication error during multi-step authentication, or may transmit the retry request based on the user's operation. For example, the mobile device 1 may display the retry button B41 for transmitting the retry request on the display 11 as illustrated in FIG. 14 based on the authentication error occurring during the multi-step authentication. The mobile device 1 may transmit the retry request based on pressing of the retry button B41.

When the DKS 3 receives the retry request, it determines a new authentication procedure that uses only the failure method indicated in the retry request. Specifically, the DKS 3 temporarily disables the failure method and selects the authentication method for each process from among the available authentication methods, thereby determining a new three-step authentication procedure.

Figure 15:
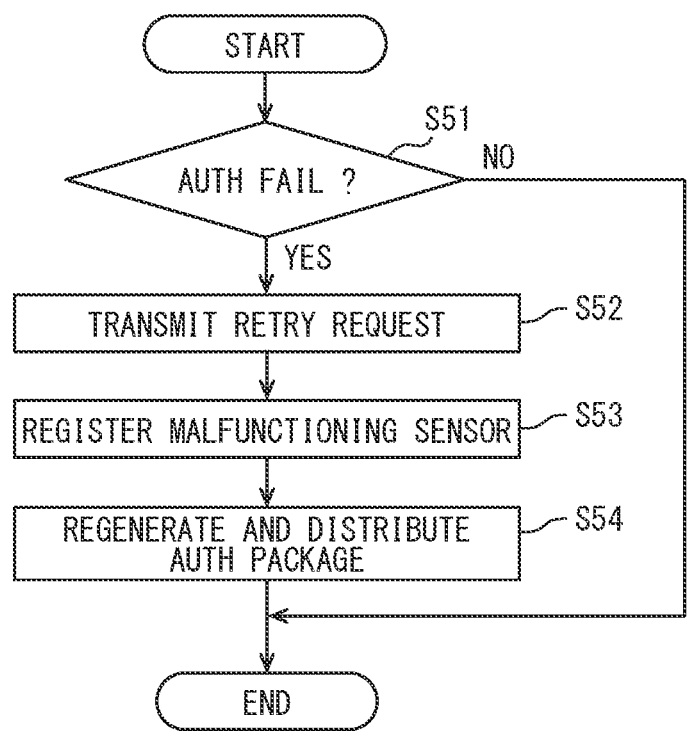
FIG. 15 is a flowchart for describing an operation of a system when the authentication error occurs.

FIG. 15 shows the processing flow corresponding to the above operation. A process in S51 shown in FIG. 15 is a process in which the mobile device 1 or the authentication ECU 4 determines whether the authentication in a certain process has succeeded. A process in S52 is a process in which the mobile device 1 transmits the retry request to the DKS 3 based on the occurrence of the authentication error. A process in S53 is a process in which the DKS 3 registers the availability status of the authentication sensor 6x corresponding to the failure method as unavailable. In the present disclosure, the authentication sensor 6x corresponding to the authentication method set to be unavailable is also referred to as a malfunction sensor. Conversely, an authentication sensor 6x corresponding to the available authentication method is also called a health sensor. A process in S54 is a process in which the DKS 3 redetermines the available authentication method or the multi-step authentication procedure using the health sensor, and redistributes the authentication package and the verification package.

Depending on the number of authentication methods or authentication sensors 6x set to be unavailable, only one authentication method may be available. The DKS 3 may perform the three-step authentication by performing the authentication method three times even if only one authentication method is available. The multi-step authentication may be one in which the same authentication method is performed multiple times. In that case, it is preferable that the verification code and the authentication code are different for each authentication process.

<Effect of Above Configuration>

According to the above configuration, the authentication ECU 4 activates only the authentication sensor 6x corresponding to the next authentication method among the multiple types of authentication sensors 6x, and causes the other authentication sensors 6x to sleep. In addition, each authentication sensor 6x is caused to sleep when the digital key application 104 does not accept a user operation for control execution. According to the configuration in which the authentication sensors 6x required for user authentication are activated on a limited basis in this manner, power consumption can be suppressed compared to the configuration in which each authentication sensor 6x is always operated.

Further, the authentication sensor 6x used in the second and subsequent authentication processes is activated when the first authentication succeeds. When the first authentication fails, the second authentication sensor and the third authentication sensor are not activated. According to the configuration, it is possible to further save the power.

Furthermore, according to the above configuration, it is possible to authenticate the user by sequentially using the multiple of authentication sensors 6x. According to the configuration of verifying the validity or authenticity of the user by the multi-step authentication, it is possible to improve the security of the vehicle Hv.

Further, in the above configuration, the DKS 3 manages the status of the authentication sensors 6x and selects the method or the sensor to be used for multi-step authentication using the available authentication sensors 6x. According to this configuration, it is possible to reduce the possibility of instructing the execution of the authentication method using the unusable authentication sensor 6x. As a result, it is possible to reduce the risk of impairing the user's convenience.

The DKS 3 described above can update the information of the unavailable authentication sensor 6x based on the result of the authentication process. For example, the DKS 3 registers unavailable authentication sensors 6x or authentication methods based on data received from the mobile device 1. According to this configuration, the DKS 3 can detect that the malfunction has occurred due to a reason that the malfunction is difficult to be detected by the sensor diagnosis unit G2. The malfunction that is difficult to be detected by the sensor diagnosis unit G2 includes, for example, antenna damage, pairing failure, protocol mismatch, lens contamination, diaphragm damage, and the like.

<Supplementary Regarding Operation in Case Where Vehicle is Outside Cellular Service Area>

An authentication procedure and a verification code for when the vehicle Hv exists outside the cellular service area (that is, for outside service area) may be registered in advance in the authentication ECU 4. For convenience, the preset outside service area authentication procedure will be referred to as an outside service area procedure.

The outside service area authentication procedure is set by the DKS 3 at a predetermined timing. For example, the DKS 3 redesigns the outside service area authentication procedure at the timing when the combination of available authentication methods changes while the in-vehicle system 2 is online, and delivers it to the authentication ECU 4 as an outside service area verification package. The outside service area verification package includes a verification code for each authentication process. The outside service area verification package may be stored in the vehicle storage 45 or the like.

Figure 16:
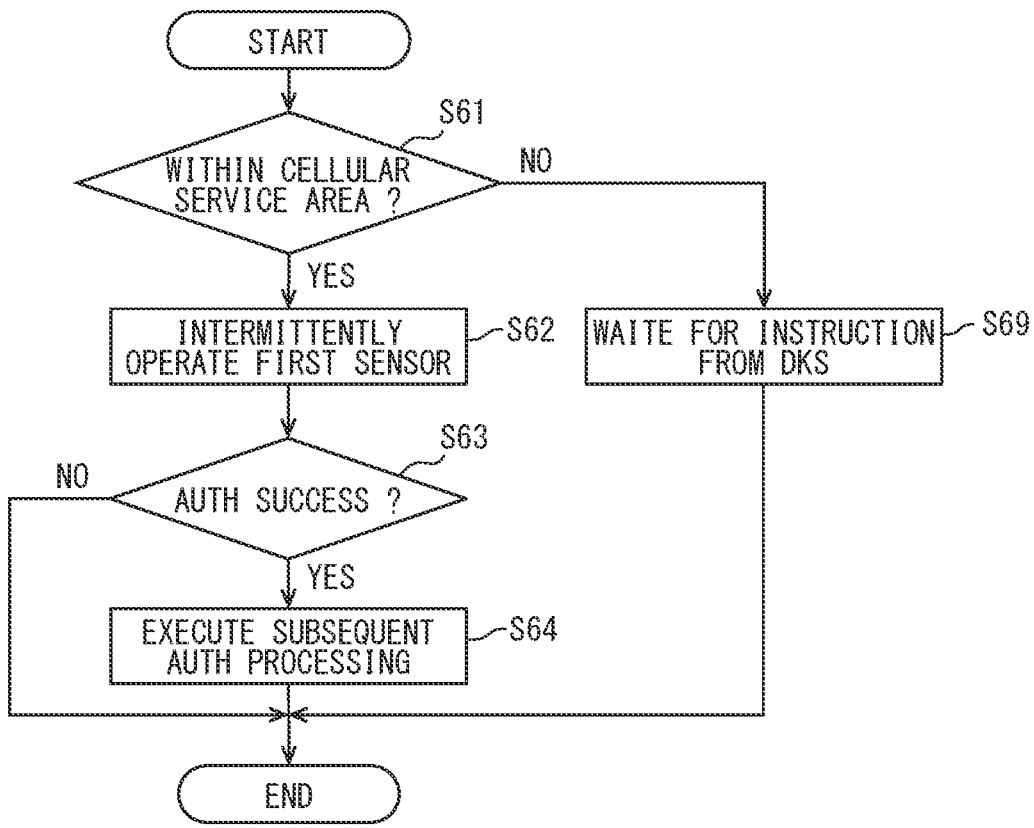
FIG. 16 is a flowchart for describing an operation of the authentication ECU when the vehicle is out of a cellular service area.

Further, the authentication ECU 4 may change its operation as shown in FIG. 16 depending on whether it exists outside the cellular service area. That is, when the vehicle Hv is parked within the cellular service area (YES in S61), the authentication ECU 4 waits for an instruction from the DKS 3, that is, to receive the verification package (S69). That is, when the vehicle Hv is parked within the cellular service area, the authentication ECU 4 keeps setting each authentication sensor 6x to the sleep state until the instruction is received from the DKS 3.

On the other hand, when the vehicle Hv from the DKS 3 is parked outside the cellular service area (NO in S61), the authentication ECU 4 intermittently activates the first sensor in the outside service area authentication procedure (S62). The activation period of the first sensor may be set to 10 seconds, 30 seconds, 1 minute, or the like.

Then, when, as a result of activating the first sensor, the authentication code is acquired from the mobile device 1, and when the first authentication has succeeded (YES in S63), the second authentication and the third authentication are performed according to the outside service area authentication procedure in order (S64).

Figure 17:
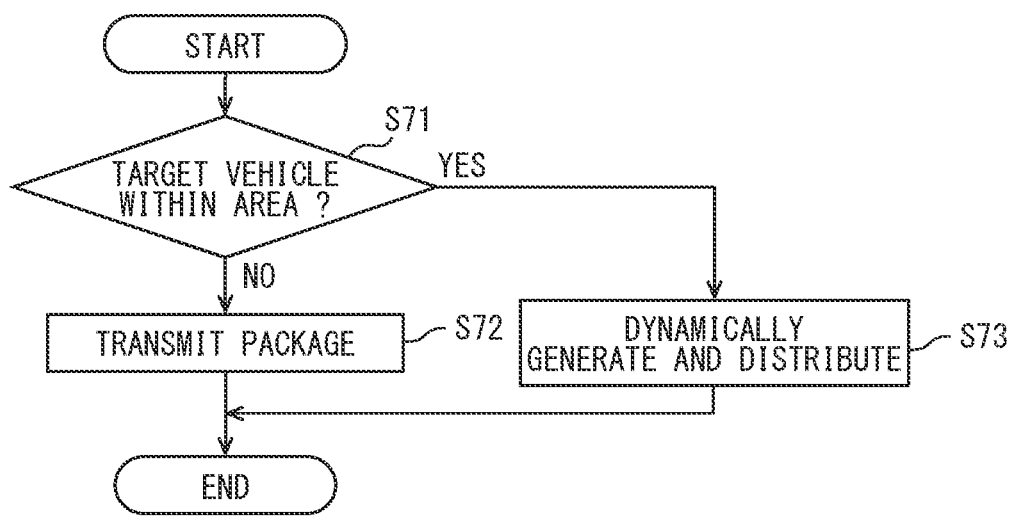
FIG. 17 is a flowchart for describing an operation of the DKS when the vehicle is out of the cellular service area.

When the DKS 3 receives the code issue request from the mobile device 1 in a situation where the vehicle Hv is outside the cellular service area (NO in S71 of FIG. 17), the DKS 3 generates an outside service area package, which is an authentication package corresponding to the outside service area authentication procedure, and distributes it to the mobile device 1 (S72). Further, in a case where, when the code issuance request is received from the mobile device 1, the vehicle Hv exists within the cellular service area (YES in S71), the authentication package corresponding to the availability information for each authentication method registered in the vehicle DB 32 is generated and distributed to the mobile device 1 (S73). The mobile device 1 can display an operation guide image according to the authentication procedure specified in the received authentication package. The outside service area package can also be called an emergency authentication data set or an emergency device command set. The emergency here refers to the situation where the in-vehicle system 2 is outside the cellular service area. The description of "outside the service area" or "outside service area" may mean an emergency situation.

The above configuration was created by paying attention to the following difficulties. That is, when the vehicle Hv is outside the cellular service area, the authentication ECU 4 cannot receive the verification package from the DKS 3. Therefore, the authentication ECU 4 cannot activate the first sensor in response to the trigger that is the reception of the verification package. For such a difficulty, according to the above configuration, when the vehicle Hv exists outside the cellular service area, the first sensor intermittently operates to try the first authentication. Therefore, the user can access the vehicle Hv using the digital key application 104 even when the vehicle Hv exists outside the cellular service area, such as in an underground parking lot or tunnel where wireless equipment is not available.

By the way, since the user or the mobile device 1 can move together with the vehicle Hv, when the vehicle Hv is positioned outside the cellular service area, there is a high possibility that the mobile device 1 is also positioned outside the cellular service area. Therefore, when the DKS 3 transmits the outside service area verification package to the vehicle Hv, the DKS 3 may also transmit a corresponding outside service area authentication package to the mobile device 1. The outside service area authentication package is a data set that includes data indicating the authentication procedure outside the cellular service area and an authentication code for each authentication process. The outside service area authentication package can be stored in the mobile storage 105.

The authentication ECU 4 may not receive the outside service area verification package before going out of the cellular service area. The authentication ECU 4 as the sensor controller G1 may intermittently operate one or more specific authentication sensors 6x when the vehicle Hv is parked outside the cellular service area. According to this configuration, the authentication ECU 4 can receive the authentication code transmitted from the mobile device 1 without the outside service area verification package. The result of the authentication or control performed outside the cellular service area may be reported as various results from the authentication ECU 4 to the DKS 3 when the vehicle Hv returns to the cellular service area.

<Supplementary Regarding the Conditions for Activating Secondary Priority Sensor>

Further, the first sensor and the second sensor are determined according to the priority set in advance. Therefore, when no abnormality is detected in the highest priority sensor, the first sensor is basically the highest priority sensor and remains constant. The similar applies to the second sensor. Therefore, when no abnormality is detected in the highest priority sensor, the authentication ECU 4 can activate the secondary priority sensor on the condition that the authentication using the highest priority sensor is successful. In other words, the authentication ECU 4 does not activate the second sensor at least until the authentication process using the first sensor is successful when the abnormality is not detected in the sensor with the highest priority as the first sensor. Of course, the above authentication ECU 4 may activate the secondary priority sensor as the first sensor when the abnormality is detected in the highest priority sensor.

According to such an authentication ECU 4, the activation frequency of the secondary priority sensor is lower than the activation frequency of the highest priority sensor. Therefore, even when the secondary priority sensor is the authentication sensor 6x that consumes relatively large power, such as the camera 63, it is possible to reduce the power consumption of the entire system. Further, when the above circumstances are reversed, the highest priority sensor may be activated more frequently among the multiple authentication sensors 6x. As the highest priority sensor, it is preferable to select the authentication sensor 6x, such as the BLE communication unit 61, which consumes less power for activation and maintenance of the standby state. Alternatively, from the viewpoint of improving user convenience, the authentication sensor 6x with the shortest activation time may be set as the highest priority sensor.

While one embodiment of the present disclosure has been described above, the present disclosure is not limited to the embodiment described above, and various modifications to be described below are included in the technical scope of the present disclosure, and may be implemented by various modifications within a scope not departing from the spirit of the present disclosure, in addition to the modifications to be described below. For example, various supplements or modifications to be described below can be executed in combination as appropriate within a scope that does not cause technical inconsistency. The members having the same functions as described above are denoted by the same reference numerals, and the description of the same members will be omitted. Further, when only a part of the configuration is mentioned, the above description can be applied to the other parts.

First Modification

In the above, the authentication ECU 4 causes the BLE communication unit 61 to sleep except when performing the BLE authentication. However, the present disclosure is not limited to this. The authentication ECU 4 may continue to operate the BLE communication unit 61 as a path for direct communication with the mobile device 1 even after the BLE authentication is completed. For example, the authentication ECU 4 may continue the active state of the BLE communication unit 61 until the control is completed or the user operation ends, after activating the BLE communication unit 61 in response to the trigger that is the reception of the verification package or the success of the first authentication for the outside service area. In this configuration, the authentication ECU 4 may directly notify the mobile device 1 of the result of each authentication process through BLE communication. According to such a configuration, direct communication is possible between the mobile device 1 and the authentication ECU 4. Therefore, it is possible to reduce the amount of cellular communication. Further, even when the vehicle Hv is parked outside the cellular service area, the authentication ECU 4 can notify the mobile device 1 of the result of each authentication process.

Second Modification

The number of authentication processes may be changed according to the security level set by the user. When the security level is set to 1 (low), the authentication ECU 4 may perform control such as unlocking by one-step authentication or one-factor authentication. When the security level is set to 2 (medium), the authentication ECU 4 may perform control such as unlocking by two-step authentication or two-factor authentication. When the security level is set to 3 (high), the authentication ECU 4 may perform control by three-step or four-step authentication. The number of security levels to be set is not limited to three, and may be two or four or more.

The security level may be set by a system administrator. When the vehicle Hv is a service car such as a shared car or rental car, the security level may be set by a service provider or manager. Further, the number of authentication processes may be changed according to the content of control. The number of authentication processes for unlocking may be two, while the number of authentication processes for locking may be one. The locking and unlocking may be executable only with the BLE authentication. When the number of authentication processes at the time of unlock two or less, one-step authentication or two-step authentication may be additionally performed when the traveling power source is turned on.

Third Modification

The authentication ECU 4 may be able to perform cellular authentication, which transmits and receives the authentication code through the cellular communication. In the above embodiment, a mode using the code image for the image authentication has been described. However, the content of image authentication may include use of a user face image. That is, the image authentication may correspond to face authentication. Of course, the authentication ECU 4 may be compatible with both the code image authentication and the face image authentication. The voice authentication is also not limited to the method using code tones, and may be so-called voice authentication that authenticates using the features of the user voice. The authentication ECU 4 may be able to implement an authentication method that uses a user biometric information without depending on the authentication code.

Further, the in-vehicle system 2 and the authentication ECU 4 may support fingerprint authentication, vein authentication, and ear acoustic authentication. The authentication sensor 6x for the fingerprint authentication is a fingerprint reader for reading fingerprints. The fingerprint reader may be of any type, capacitive, optical, or ultrasonic. The authentication sensor 6x compatible with vein authentication is a so-called vein scanner or vein sensor, and refers to a device that uses infrared rays to read a vein pattern of a hand or finger. The authentication sensor 6x for ear acoustic authentication refers to a hearable device or hearing device worn on the ear. The hearable device can transmit the authentication result of the wearer to the authentication ECU 4 by BLE communication. The ear acoustic authentication result of the hearable device may be transferred to the in-vehicle system 2 via the mobile device 1.

The authentication ECU 4 may temporarily use another authentication sensor 6x as the first sensor on condition that the BLE communication unit 61 as the first sensor has malfunctioned. The DKS 3 may perform guidance so as to use the authentication sensor 6x with the second highest priority for the mobile device 1 when the malfunction is detected in the default first sensor.

Fourth Modification

Although the DKS 3 issues the encryption key in the above description, the present disclosure is not limited to this. The authentication ECU 4 may have an encryption key issuing function. In that case, the authentication ECU 4 may upload a static encryption key to the DKS 3.

The above describes how DKS 3 automatically designs multi-step authentication. However, the digital key application 104 may determine the multi-step authentication execution procedure based on the user operation, and transmit it to the DKS 3. According to this configuration, it is possible to implement multi-step authentication in a procedure according to the user preference. In the DKS 3 and the authentication ECU 4, the user may register in advance several authentication patterns with different combinations of authentication methods as a configuration for the multi-step authentication. The DKS 3 or the authentication ECU 4 may use the second pattern when the malfunction is detected in any of the multiple authentication sensors 6x used in the first pattern.

Fifth Modification

The mobile device 1 may transmit the code issue request at the timing when the BLE communication link is established with the in-vehicle system 2. In addition, when the authentication ECU 4 detects a user operation on the vehicle Hv while the BLE communication link with the mobile device 1 is established, the authentication ECU 4 may transmit a code acquisition request to the mobile device 1 via BLE communication. The code acquisition request is a signal requesting to acquire the authentication package from DKS 3. The mobile device 1 may transmit the code issue request to the DKS 3 based on the reception of the code acquisition request from the authentication ECU 4. Along with this, the authentication ECU 4 may download from the DKS 3 the verification package corresponding to the connection target of BLE communication when a user operation to the vehicle Hv is detected in a state where the BLE communication link with the mobile device 1 is established.

<Vehicle to Which Present Disclosure can be Applied>

The vehicle Hv is, for example, a vehicle owned by an individual. Here, the vehicle Hv may be a company vehicle owned by a company organization or a public vehicle owned by a public institution. Further, the vehicle Hv may be a vehicle provided for a rental service or a sharing service. The vehicle Hv is, for example, an electric vehicle, more specifically a plug-in hybrid vehicle. The concept of electric vehicles includes not only electric vehicles but also fuel cell vehicles and hybrid vehicles. The present disclosure is also applicable to engine vehicles. The present disclosure may not be limited to four-wheeled vehicles, alternatively, the present device may be mounted on various vehicles that can travel on the road, such as trailers, two-wheeled vehicles, and three-wheeled vehicles. Motorized bicycles may also be included in the two-wheeled vehicles.

(First Additional Note)

The present disclosure also includes the following technical ideas.

<First Technical Idea>

A lock control device is connected to a first authentication sensor that acquires information for authenticating a user by a predetermined method and a second authentication sensor that acquires information for authenticating the user by a method different from the predetermined method of the first authentication sensor. The lock control device includes: an abnormality detection unit configured to detect an abnormality of the first authentication sensor; and a controller configured to control an operation of each of the first authentication sensor and the second authentication sensor. When the abnormality detection unit has not detected the abnormality of the first authentication sensor, the controller does not activate the second authentication sensor until an authentication process using at least the first authentication sensor is successful.

(Second Technical Idea)

When the abnormality detection unit has detected the abnormality of the first authentication sensor or when the authentication process using the first authentication sensor has been successful, the controller activates the second authentication sensor.

(Third Technical Idea)

The lock control device is connected to a communication unit for wirelessly connecting to a wide area communication network. When the controller has not received a command set from a predetermined server via the wide area communication network, the controller sets the first authentication sensor and the second authentication sensor to a power saving state. when the controller has received the command set from the server via the wide area communication network, the controller returns the first authentication sensor to a normal state.

<Fourth Technical Idea>

The lock control device is connected to a communication unit for wirelessly connecting to a wide area communication network. The lock control device includes a communication controller configured to control an operation of the communication unit and determine whether the communication unit is in a connectable state with the wide area communication network based on a signal reception status of the communication unit. When determining that the communication unit is in the connectable state with the wide area communication network, the controller operates the first authentication sensor in response to reception of a command set. When determining that the communication unit is not in the connectable state with the wide area communication network, the controller intermittently operates the first authentication sensor.

<Fifth Technical Idea>

A vehicle digital key system includes: an in-vehicle device configured to authenticate a person trying to access a vehicle using at least one of a plurality of authentication methods; a mobile device that is an information terminal carried by a user of the vehicle; and a server configured to perform data communication with the mobile device and the in-vehicle device. The in-vehicle device includes a controller configured to control an operation of each of a plurality of authentication sensors corresponding to the plurality of authentication methods. The mobile device includes an operation response unit configured to transmit, to the server, an operation start signal that is a signal for starting authentication based on a user operation. The plurality of authentication methods include a usable method and an unusable method. The server includes: a status management unit configured to collect information related to the unusable method and usable method by communicating with the in-vehicle device or the mobile device; a selection unit configured to select an adapted method that is an authentication method actually used for an authentication process from the usable method in response to reception of the operation start signal from the mobile device; and a transmission processing unit configured to transmit, to the in-vehicle device, a command set including information related to at least one adopted method selected by the selection unit. The controller is configured to activate, among the plurality of authentication sensors, an authentication sensor corresponding to the adopted method indicated by the command set and is configured not to activate an authentication sensor corresponding to an unusable method different from the usable method.

<Sixth Technical Idea>

The system is configured to authenticate the user based on a success of a multi-step authentication including a plurality of authentication processes. The server includes an order determination unit configured to determine the adopted method used for each of the plurality of authentication processes of the multi-step authentication. The transmission processing unit is configured to transmit, to the in-vehicle device, the command set indicating the adopted method that is determined by the order determination unit and used for each authentication process. The controller is configured to activate the authentication sensor used for a first authentication process among the plurality of authentication processes, and not to activate an authentication sensor different from the authentication sensor used for the first authentication process.

<Seventh Technical Idea>

The controller is configured to activate the authentication sensor used for a second authentication process based on a success of the first authentication process.

<Eighth Technical Idea>

The mobile device transmits an error message indicating an abnormality of the first authentication sensor in response to a failure of the authentication process using a first authentication sensor among the plurality of authentication sensors.

The server is configured to set the authentication method using the first authentication sensor to the unusable method in response to reception of the error message from the mobile device.

<Ninth Technical Idea>

The mobile device transmits an error message indicating an abnormality of the first authentication sensor in response to a failure of the authentication process using a first authentication sensor among the plurality of authentication sensors.

The server is configured to transmit, to the in-vehicle device, the command set indicating a procedure of the multi-step authentication that does not use the first authentication sensor, in response to reception of the error message from the mobile device.

<Tenth Technical Idea>

The server determines whether the in-vehicle device is in a communicable state with the server based on a communication status with the in-vehicle device, and transmits an emergency authentication data set indicating a preset authentication procedure when the in-vehicle device is not in the communicable state with server. The mobile device is configured to cause a display to display a guide image for an authentication operation based on the emergency authentication data set.

<Eleventh Technical Idea>

The in-vehicle device is configured to control an operation of a communication unit for a wireless connection with a wide area communication network, and includes a communication controller configured to control an operation of the communication unit and determine whether the communication unit is in a connectable state with the wide area communication network based on a signal reception status of the communication unit. The controller is configured to operate a part of or all of the plurality of authentication sensors when the communication controller has determined that the communication unit is not in the connectable state with the wide area communication network.

(Second Additional Note)

The various flowcharts shown in the present disclosure are all examples, and the number of processes constituting the flowcharts and the execution order of the processes can be changed as appropriate. Further, the device, the system, and the method therefor which have been described in the present disclosure may be also realized by a dedicated computer which constitutes a processor programmed to execute one or more functions concretized by computer programs. The device and the method described in the present disclosure may be also implemented by a dedicated hardware logic circuit. Further, the device and the method described in the present disclosure may be also implemented by one or more dedicated computers which are constituted by combinations of a processor for executing computer programs and one or more hardware logic circuits. As a processor (arithmetic core), a CPU, an MPU, a GPU, a DFP (Data Flow Processor), or the like can be adopted. Some or all of the functions of the DKS 3, the authentication ECU 4, or the mobile device 1 may be implemented using SoC (System-on-Chip), IC (Integrated Circuit), or FPGA (Field-Programmable Gate Array). The concept of IC also includes ASIC (Application Specific Integrated Circuit).

Further, the computer program may be stored in a computer-readable non-transitionary tangible storage medium as an instruction executed by the computer. As a program storage medium, an HDD (Hard-disk Drive), an SSD (Solid State Drive), a flash memory, or the like can be adopted. The scope of the present disclosure also includes programs for causing a computer to function as the DKS 3, the authentication ECU 4, or the mobile device 1, non-transitory tangible storage mediums such as semiconductor memories which store these programs, and other aspects.

Here, the process of the flowchart or the flowchart described in this application includes a plurality of sections (or steps), and each section is expressed as, for example, S11. Further, each section may be divided into several subsections, while several sections may be combined into one section. Furthermore, each section thus configured may be referred to as a device, module, or means.

The invention claimed is:

1. A lock control device connected to a first authentication sensor that acquires information for authenticating a user by a predetermined method and a second authentication sensor that acquires information for authenticating the user by a method different from the predetermined method of the first authentication sensor, the lock control device comprising:
an abnormality detection unit configured to detect an abnormality of the first authentication sensor; and
a controller configured to control an operation of each of the first authentication sensor and the second authentication sensor,
wherein
when the abnormality detection unit has not detected the abnormality of the first authentication sensor, the controller does not activate the second authentication sensor until an authentication process using at least the first authentication sensor is successful,
the lock control device is connected to a communication unit for wirelessly connecting to a wide area communication network,
when the controller has not received a command set for providing an instruction of a start of a process for authenticating the user from a predetermined server via the wide area communication network, the controller sets the first authentication sensor and the second authentication sensor to a power saving state, and
when the controller has received the command set from the server via the wide area communication network, the controller maintains the power saving state of the second authentication sensor and returns the first authentication sensor to a normal state.

2. The lock control device according to claim 1, wherein when the abnormality detection unit has detected the abnormality of the first authentication sensor or when the authentication process using the first authentication sensor has been successful, the controller activates the second authentication sensor.

3. The lock control device according to claim 1, wherein the lock control device
is connected to a communication unit for wirelessly connecting to a wide area communication network, and
includes a communication controller configured to control an operation of the communication unit and determine whether the communication unit is in a connectable state with the wide area communication network based on a signal reception status of the communication unit,
when determining that the communication unit is in the connectable state with the wide area communication network, the controller operates the first authentication sensor in response to reception of a command set for providing an instruction of a start of the process for authenticating the user, and
when determining that the communication unit is not in the connectable state with the wide area communication network, the controller intermittently operates the first authentication sensor.

4. The lock control device according to claim 3, wherein a second processor serves as the communication unit, and the lock control device further includes a first processor that serves as the communication controller.

5. The lock control device according to claim 1, further comprising
a first processor that serves as the abnormality detection unit and the controller.

6. The lock control device according to claim 1, wherein a second processor serves as the communication unit.

7. A vehicle digital key system comprising:
an in-vehicle device configured to authenticate a person trying to access a vehicle using at least one of a plurality of authentication methods;
a mobile device that is an information terminal carried by a user of the vehicle; and
a server configured to perform data communication with the mobile device and the in-vehicle device,
wherein
the in-vehicle device includes a controller configured to control an operation of each of a plurality of authentication sensors corresponding to the plurality of authentication methods,
the mobile device includes an operation response unit configured to transmit, to the server, an operation start signal that is a signal for starting authentication based on a user operation,
the plurality of authentication methods include a usable method and an unusable method,
the server includes:
a status management unit configured to collect information related to the unusable method and the usable method by communicating with the in-vehicle device or the mobile device;
a selection unit configured to select an adapted method that is an authentication method actually used for an authentication process from the usable method in response to reception of the operation start signal from the mobile device; and
a transmission processing unit configured to transmit, to the in-vehicle device, a command set including information related to at least one adopted method selected by the selection unit, and the controller
is configured to activate, among the plurality of authentication sensors, an authentication sensor corresponding to the adopted method indicated by the command set and
is configured not to activate an authentication sensor corresponding to an unusable method different from the usable method.

8. The vehicle digital key system according to claim 7, wherein
the system is configured to authenticate the user based on a success of a multi-step authentication including a plurality of authentication processes,
the server includes an order determination unit configured to determine the adopted method used for each of the plurality of authentication processes of the multi-step authentication,
the transmission processing unit is configured to transmit, to the in-vehicle device, the command set indicating the adopted method that is determined by the order determination unit and used for each authentication process,
the controller is configured
to activate the authentication sensor used for a first authentication process among the plurality of authentication processes, and
not to activate an authentication sensor different from the authentication sensor used for the first authentication process.

9. The vehicle digital key system according to claim 8, wherein
the controller is configured to activate the authentication sensor used for a second authentication process based on a success of the first authentication process.

10. The vehicle digital key system according to claim 8, wherein
the mobile device transmits an error message indicating an abnormality of a first authentication sensor among the plurality of authentication sensors in response to a failure of the authentication process using the first authentication sensor, and
the server is configured to set the authentication method using the first authentication sensor to the unusable method in response to reception of the error message from the mobile device.

11. The vehicle digital key system according to claim 8, wherein
the mobile device transmits an error message indicating an abnormality of a first authentication sensor among the plurality of authentication sensors in response to a failure of the authentication process using the first authentication sensor, and
the server is configured to transmit, to the in-vehicle device, the command set indicating a procedure of the multi-step authentication that does not use the first authentication sensor, in response to reception of the error message from the mobile device.

12. The vehicle digital key system according to claim 8, wherein
the server is configured to
determine whether the in-vehicle device is in a communicable state with the server based on a communication status with the in-vehicle device, and
transmit an emergency authentication data set indicating a preset authentication procedure when the in-vehicle device is not in the communicable state with server, and
the mobile device is configured to cause a display to display a guide image for an authentication operation based on the emergency authentication data set.

13. The vehicle digital key system according to claim 8, wherein
the in-vehicle device
is configured to control an operation of a communication unit for a wireless connection with a wide area communication network, and
includes a communication controller configured to control an operation of the communication unit and determine whether the communication unit is in a connectable state with the wide area communication network based on a signal reception status of the communication unit, and
the controller is configured to operate some or all of the plurality of authentication sensors when the communication controller has determined that the communication unit is not in the connectable state with the wide area communication network.

14. The vehicle digital key system according to claim 13, wherein
the in-vehicle device includes a first processor that serves as the communication controller, and
a fourth processor that serves as the communication unit.

15. The vehicle digital key system according to claim 8, wherein
the server includes a third processor that serves as the status management unit, the selection unit, the transmission processing unit, and the order determination unit.

16. The vehicle digital key system according to claim 7, wherein
the in-vehicle device includes a first processor that serves as the controller,
the mobile device includes a second processor that serves as the operation response unit, and
the server includes a third processor that serves as the status management unit, the selection unit, and the transmission processing unit.

17. A lock control device connected to a first authentication sensor that acquires information for authenticating a user by a predetermined method and a second authentication sensor that acquires information for authenticating the user by a method different from the predetermined method of the first authentication sensor, the lock control device comprising:
an abnormality detection unit configured to detect an abnormality of the first authentication sensor; and
a controller configured to control an operation of each of the first authentication sensor and the second authentication sensor,
wherein
when the abnormality detection unit has not detected the abnormality of the first authentication sensor, the controller does not activate the second authentication sensor until an authentication process using at least the first authentication sensor is successful,
the lock control device
is connected to a communication unit for wirelessly connecting to a wide area communication network, and
includes a communication controller configured to control an operation of the communication unit and determine whether the communication unit is in a connectable state with the wide area communication network based on a signal reception status of the communication unit, when determining that the communication unit is in the connectable state with the wide area communication network, the controller operates the first authentication sensor in response to reception of a command set for providing an instruction of a start of the process for authenticating the user, and when determining that the communication unit is not in the connectable state with the wide area communication network, the controller intermittently operates the first authentication sensor.

* * * * *